(12) United States Patent
Didey

(10) Patent No.: US 9,908,621 B2
(45) Date of Patent: *Mar. 6, 2018

(54) LANDING GEAR DRIVE SYSTEMS

(71) Applicant: AIRBUS OPERATIONS LIMITED, Bristol (GB)

(72) Inventor: Arnaud Didey, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 166 days.

This patent is subject to a terminal disclaimer.

(21) Appl. No.: 14/419,998

(22) PCT Filed: Aug. 1, 2013

(86) PCT No.: PCT/GB2013/052064
§ 371 (c)(1),
(2) Date: Feb. 6, 2015

(87) PCT Pub. No.: WO2014/023941
PCT Pub. Date: Feb. 13, 2014

(65) Prior Publication Data
US 2015/0210385 A1 Jul. 30, 2015

(30) Foreign Application Priority Data

Aug. 8, 2012 (GB) .................................. 1214198.2
May 13, 2013 (GB) .................................. 1308585.7

(51) Int. Cl.
*B64C 25/40* (2006.01)
*B64C 25/34* (2006.01)
(Continued)

(52) U.S. Cl.
CPC ............ *B64C 25/405* (2013.01); *B64C 25/34* (2013.01); *F16H 1/20* (2013.01); *F16H 1/24* (2013.01);
(Continued)

(58) Field of Classification Search
CPC ......... B64C 25/405; B64C 25/34; F16H 1/20; F16H 1/24
(Continued)

(56) References Cited

U.S. PATENT DOCUMENTS 594,110 A * 11/1897 Higgins .................. F16H 55/10
74/465
860,536 A * 7/1907 Ellingham .............. F16H 55/10
74/465
(Continued)

FOREIGN PATENT DOCUMENTS

CN 2044665 U 9/1989
CN 2378576 Y * 5/2000 ............. F16H 55/00
(Continued)

OTHER PUBLICATIONS

English machine translation of JP 2010203608A.*
(Continued)

*Primary Examiner* — Tien Q Dinh
*Assistant Examiner* — Alexander V Giczy
(74) *Attorney, Agent, or Firm* — Hauptman Ham, LLP

(57) ABSTRACT

A drive system for rotating one or more wheels of an aircraft landing gear for ground taxiing and/or spin-up prior to landing has a motor operable to rotate a first drive pinion via a first drive path, and a driven gear adapted to be fixed to the wheel. The drive system has a first configuration in which the first drive pinion meshes with the driven gear to permit the motor to drive the driven gear via the first drive path. One of the first drive pinion and the driven gear comprises a first sprocket and the other comprises a series of rollers arranged in two or more rows, each row of rollers being arranged to form a ring. The rollers are rotatable about pins fixed to an annular support member, and adjacent rows may be out of phase by a fraction of roller pitch.

17 Claims, 21 Drawing Sheets

(51) Int. Cl.
  *F16H 1/20* (2006.01)
  *F16H 1/24* (2006.01)
(52) U.S. Cl.
  CPC ........ *Y02T 50/823* (2013.01); *Y10T 74/19219* (2015.01); *Y10T 74/19614* (2015.01)
(58) Field of Classification Search
  USPC ...................................... 301/6.1–6.2; 74/413
  See application file for complete search history.

(56) References Cited

U.S. PATENT DOCUMENTS

| | | | |
|---|---|---|---|
| 3,005,510 A * | 10/1961 | Phillips | B64C 25/405 180/14.7 |
| 3,397,589 A | 8/1968 | Moore | |
| 3,850,389 A | 11/1974 | Dixon | |
| 4,659,039 A | 4/1987 | Valdes | |
| 5,247,847 A | 9/1993 | Gu | |
| 5,456,638 A * | 10/1995 | Osborn | F16H 55/17 474/155 |
| 9,469,397 B2 * | 10/2016 | Didey | B64C 25/405 |
| 9,499,260 B2 | 11/2016 | Christensen et al. | |
| 2006/0035739 A1 * | 2/2006 | Osborn | F16H 1/34 474/155 |
| 2006/0065779 A1 | 3/2006 | McCoskey et al. | |
| 2009/0294577 A1 | 12/2009 | Roques et al. | |
| 2010/0006354 A1 * | 1/2010 | Kastan | B60S 13/00 180/19.2 |
| 2012/0153075 A1 | 6/2012 | Wilson et al. | |
| 2013/0026284 A1 * | 1/2013 | Christensen | B64C 25/405 244/50 |
| 2013/0200210 A1 | 8/2013 | Oswald et al. | |
| 2014/0225421 A1 * | 8/2014 | Oswald | B64C 25/405 301/6.2 |
| 2015/0314862 A1 | 11/2015 | Blanc et al. | |

FOREIGN PATENT DOCUMENTS

| | | | |
|---|---|---|---|
| CN | 102574581 B | 12/2014 | |
| DE | 8806683 U1 * | 8/1988 | ............ A47J 43/082 |
| EP | 2527249 A1 | 11/2012 | |
| EP | 2551192 A2 | 1/2013 | |
| FR | 2954236 A1 | 6/2011 | |
| JP | S4933276 U | 3/1974 | |
| JP | S6091837 U | 6/1985 | |
| JP | H01500211 A | 1/1989 | |
| JP | 2010203608 A | 9/2010 | |
| RU | 2395428 C1 | 7/2010 | |
| RU | 2015108037 A | 9/2016 | |
| WO | 01/46605 A1 | 6/2001 | |
| WO | 0146605 A1 | 6/2001 | |
| WO | 2005/035358 A2 | 4/2005 | |
| WO | 2011/023505 A2 | 3/2011 | |
| WO | 2011023505 A2 | 3/2011 | |
| WO | 2011/134503 A1 | 11/2011 | |
| WO | 2012/171589 A1 | 12/2012 | |

OTHER PUBLICATIONS

English machine translation of JP S49-033276U1.*
English machine translation of JP S60-091837U1.*
English machine translation of JP S64-500211A.*
RU 2395428—Derwent Summary.*
International Search Report dated Oct. 30, 2013 in International Application No. PCT/GB2013/052064, filed Aug. 1, 2013.
Written Opinion dated Oct. 30, 2013 in International Application No. PCT/GB2013/052064, filed Aug. 1, 2013.
UK Search Report dated Nov. 7, 2013 in Great Britain Application No. 1308585.7.
Honda et al., "Research on the Trochoidal Gears (1st Report)—Classification and Basic Formulas of the Trochoidal Gears-", Translation of Journal of the Japan Society for Precision Engineering, 1994, vol. 60, No. 7, p. 949-953.
Honda , "Research on the Trochoidal Gears (2nd Report)—Pressure Angle of Trochoidal Gears and Modification of Tooth Profile-", Translation of Journal of the Japan Society for Precision Engineering, 1995, vol. 61, No. 2, p. 208-212.
International Search Report dated Dec. 4, 2013 in International Application No. PCT/GB2013/052061, filed Aug. 1, 2013.
Written Opinion dated Dec. 4, 2013 in International Application No. PCT/GB2013/052061, filed Aug. 1, 2013.
UKIPO Search Report dated Nov. 27, 2012 in GB Application No. 1214198.2.

* cited by examiner

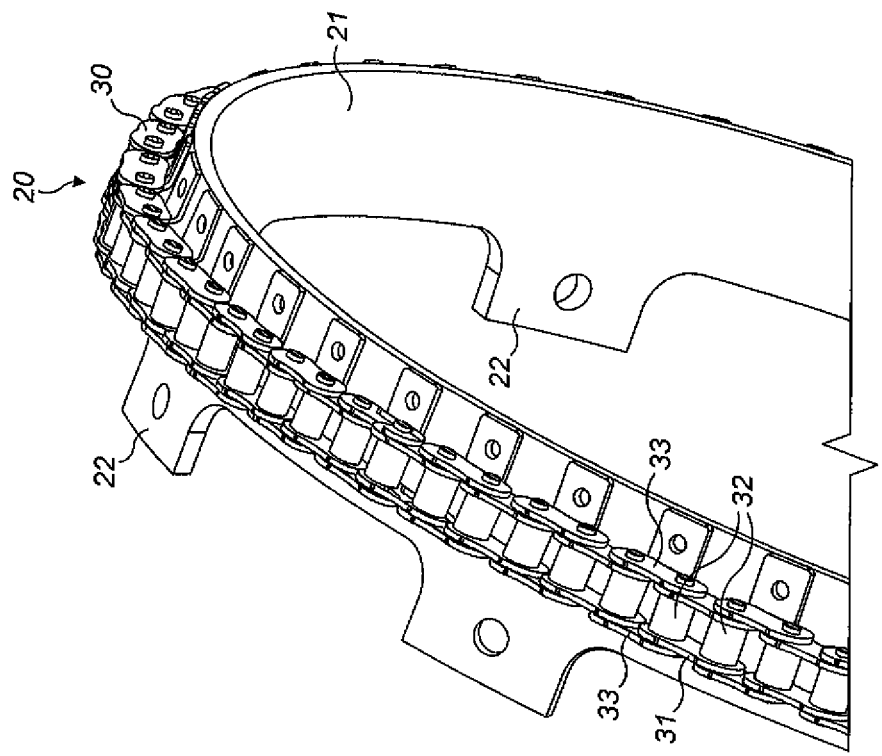
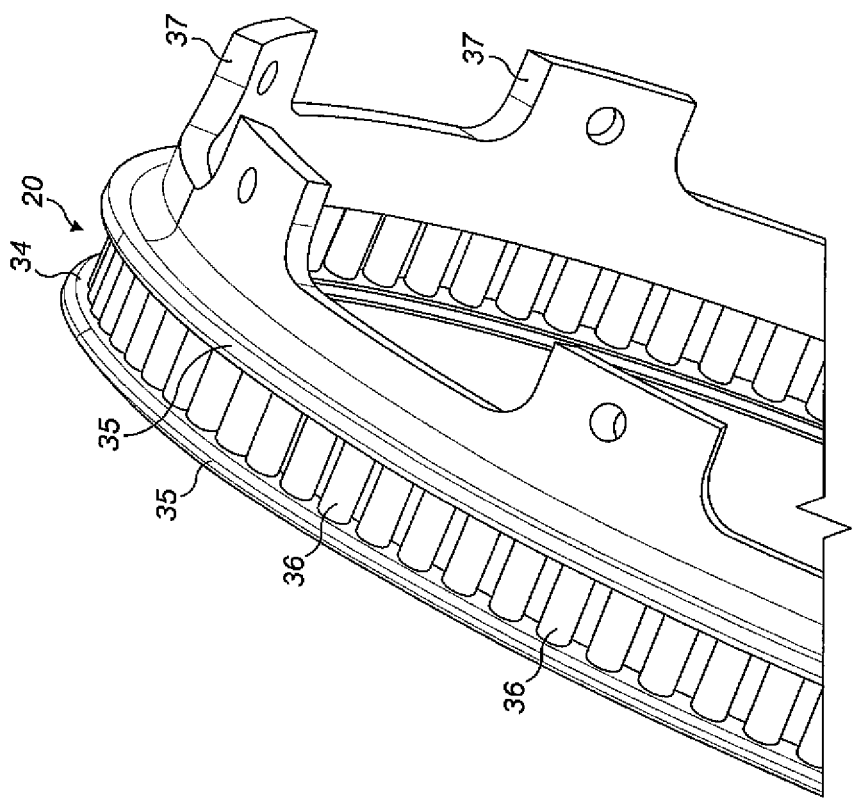
FIG. 8(B)
FIG. 8(A)

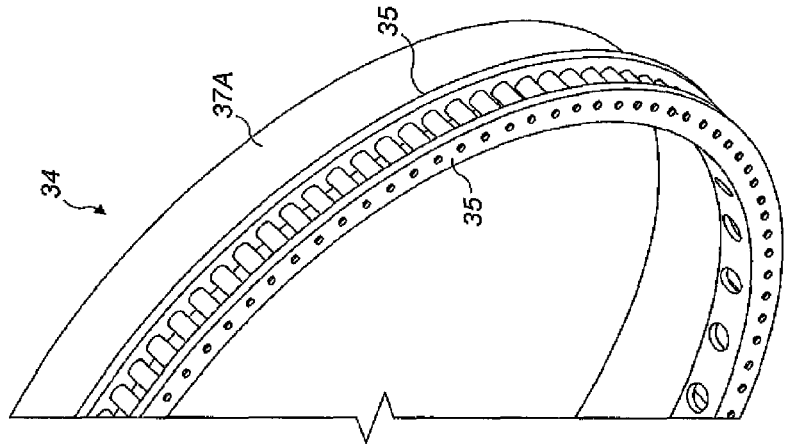
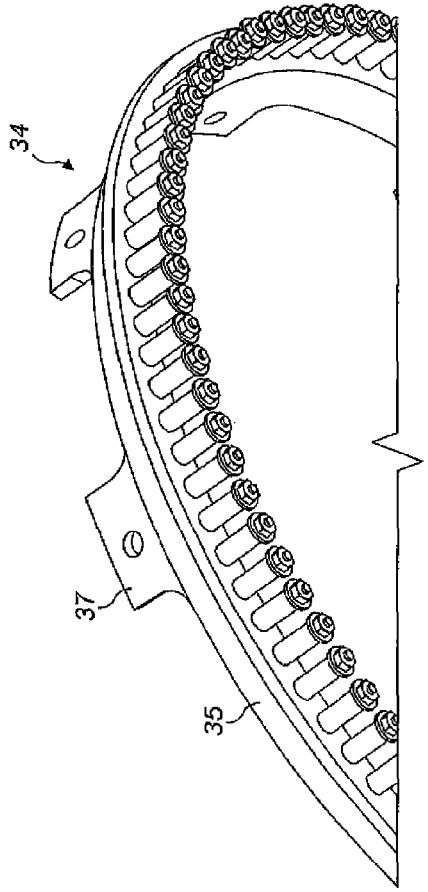
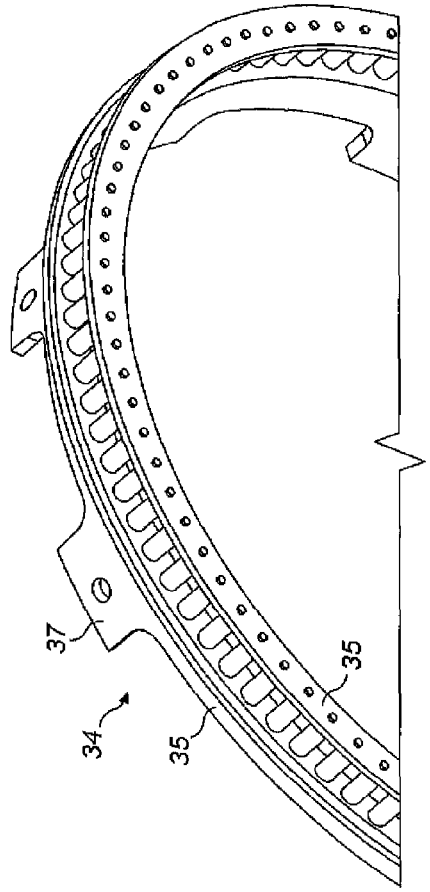

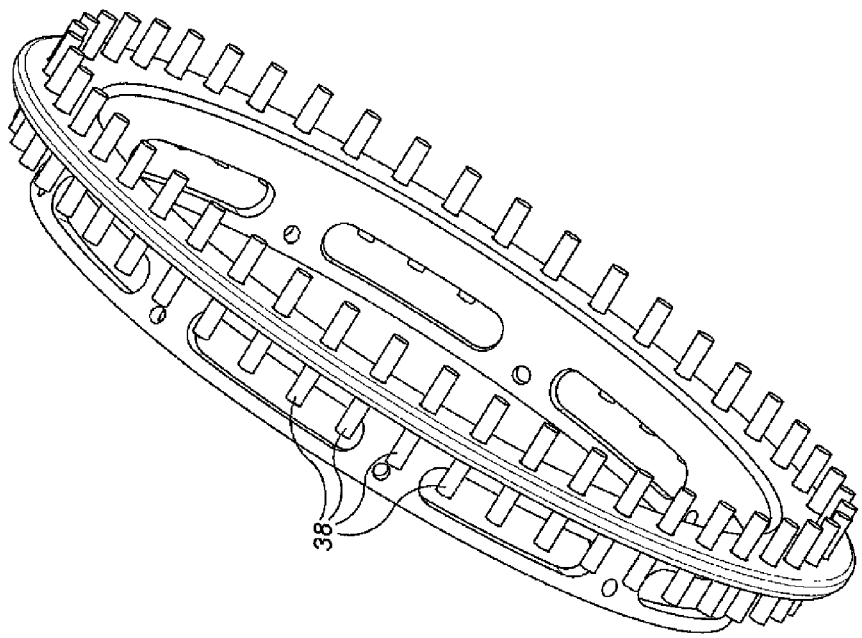
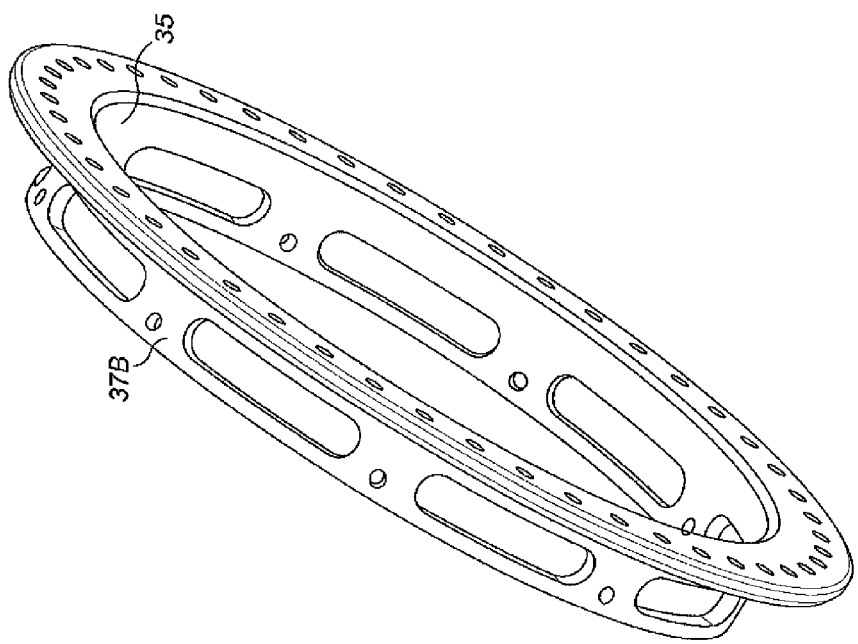
FIG. 22(B)
FIG. 22(A)

LANDING GEAR DRIVE SYSTEMS

RELATED APPLICATIONS

The present application is a National Phase of International Application Number PCT/GB2013/052064, filed Aug. 1, 2013, and claims priority from Great Britain Application Number 1214198.2, filed Aug. 8, 2012 and Great Britain Application Number 1308585.7, filed May 13, 2013.

FIELD OF THE INVENTION

The present invention relates to drive systems for rotating one or more wheels of an aircraft landing gear for the purposes of ground taxiing and/or spin-up prior to landing.

BACKGROUND OF THE INVENTION

Aircraft are required to ground taxi between locations on airfields. An example is taxiing between a runway and the location (e.g. terminal gate) at which the aircraft's passengers are to board or disembark. Typically, such taxiing is achieved by using the thrust from the aircraft's engines to propel the aircraft forwards so that the landing gear wheels are caused to rotate. Since ground taxi speeds are necessarily relatively low, the engines must be run at a very low power. This means that there is a relatively high fuel consumption as a result of the poor propulsion efficiency at this low power. This leads to an increased level of both atmospheric and noise pollution locally around airports. Moreover, even when the engines are run at low power it is generally necessary to apply the wheel brakes to limit ground taxi speeds, leading to a high degree of brake wear.

Reversing of a civil aircraft, e.g. away from a terminal gate, using its main engines is not permitted. When reversing is necessary, or in other situations where ground taxiing via main engine thrust is not practicable, tow trucks are used to manoeuvre aircraft around. This process is laborious and costly.

There is therefore a need for a drive system to power the wheels of an aircraft landing gear during ground taxi operations. There is also a desire to use such a drive system to pre-spin the wheels prior to landing, so that the wheels are already spinning at, or near, their initial landing speed on touch down. Such pre-landing spin-up is perceived to reduce tyre wear on landing, and reduce loads transmitted to the landing gear during landing.

Several autonomous ground taxi systems for both driving the wheels while the aircraft is on the ground and spinning them up prior to landing have been proposed in recent years. An example is disclosed in US2006/0065779, which proposes a powered nose aircraft wheel system in which a clutch is used to switch between a mode in which the wheel can spin freely and a mode in which the wheel can be driven by an electric motor. The clutch can also operate to enable the motor to pre-spin the wheel prior to landing.

Such prior art systems are typically limited to nose landing gears because they take up too much space to be able to be integrated into a main landing gear in which much of the space around the wheels is taken up by braking systems. However, nose landing gears only support a small fraction of the vertical loads supported by the landing gear as a whole during ground taxi operations (approximately 5% of the aircraft weight). There may therefore be insufficient traction between a driven nose landing gear wheel and the ground to enable reliable aircraft ground taxiing. This is a particular concern when the aircraft centre of gravity is towards its aft limit and when the ground surface is slippery.

A prior art arrangement which is not restricted to nose landing gears is described in WO2011/023505. The disclosed system uses an actuator to move a driven toothed pinion gear in and out of driving engagement with a toothed ring gear on the wheel. This system is limited to ground taxi operations.

SUMMARY OF THE INVENTION

A first aspect of the invention provides a drive system for rotating a wheel of an aircraft landing gear, the drive system including a motor operable to rotate a first drive pinion via a first drive path, and a driven gear adapted to be fixed to the wheel, wherein the drive system has a first configuration in which the first drive pinion is capable of meshing with (i.e. capable of driving engagement with) the driven gear to permit the motor to drive the driven gear via the first drive path, and wherein one of the first drive pinion and the driven gear comprises a first sprocket and the other of the first drive pinion and the driven gear comprises a series of rollers arranged in two or more rows, each row of rollers being arranged to form a ring, each roller being rotatable about a roller axis at a fixed distance from (and substantially parallel to) an axis of rotation of the first drive pinion or driven gear, respectively.

A key advantage of achieving the motor-wheel connection via a sprocket and series of rollers arranged in a ring is that such a mechanism is inherently robust and tolerant of environmental contamination. Thus, it may not be necessary to enclose the drive system within a casing to prevent ingress of debris and other contaminants. In contrast, drive system arrangements employing meshing toothed gears, such as that disclosed in WO2011/023505, must be suitably protected from contaminants, the required protective casing adding both weight and expense, and making routine inspection difficult.

Another advantage of the sprocket-roller arrangement is that it is more tolerant of wheel deformation and misalignment between pinion and driven gear than meshing toothed gear arrangements. Landing gear wheels are subject to high loads and consequential deformation during ground taxiing, and a driven gear fixed to the wheel will inevitably deform in response to such wheel deformation. Meshing toothed gears are intolerant of such deformation and a typical toothed rim gear may need to be isolated from the wheel via bearings, a flexible interface, or similar. In contrast, the sprocket and roller arrangement of the present invention is able to tolerate the deformation without such modification.

In the first configuration each row of sprocket teeth may be capable of meshing with a respective row of rollers. For a given pitch of the sprocket the applicable loads will be limited, so increasing the number of co-axial sprockets and co-axial rings of rollers increases the load rating of the engagement.

In some embodiments the series of rollers may be provided by a roller gear. Thus, each of the series of rollers may be rotatable about a pin, the pins optionally being supported by an annular support member, or between two annular support members. Such an arrangement has the advantage of being lightweight and having high structural strength. The main failure mode of the rollers is via shear failure of the pins; by mounting each roller directly on its respective pin, with no intermediate sleeve, bush or other part, the diameter of the pin can be maximised to maximise shear strength.

Two of the rows of rollers may be arranged one on each side of the annular support member. The roller gear may further comprise two annular rings, wherein the rows of rollers extend between the annular support member and a respective one of the annular rings. Each of the pins may have a centre between opposite ends, and the centre of each pin may be fixed to the annular support member. Alternatively, each of the pins may be fixed at one end to the annular support member.

Adjacent rows of rollers and rows of sprocket teeth may be in phase, or may be out of phase by any fraction of the roller/teeth pitch.

Each sprocket may comprise a single wheel having a series of teeth arranged in two parallel rows. Alternatively, each sprocket may comprise two wheels arranged co-axially, each wheel having a series of teeth. The sprocket may have a groove between adjacent rows of teeth.

In other embodiments the series of rollers may be provided by a roller chain (also known as an attachment chain, or attachment roller chain) extending around an outer circumference of a support member and being fixed thereto. This arrangement may be less expensive to implement than the roller gear arrangement discussed above. Roller chains are typically utilised so that they extend around one or more sprocket wheels so that the chain is movable relative to those sprocket wheels. By arranging the roller chain so that it is fixed to the support member the roller chain is not required to flex (i.e. there is no relative movement between neighbouring links) and thus the chain is subject to less wear. This in turn leads to a longer useful life of the chain and reduced maintenance costs. Moreover, the roller chain is less likely to become detached from the support member in the event of a failure. However, a small risk of chain detachment remains, making roller chain embodiments potentially less preferred than roller gear embodiments. In roller chain embodiments the first sprocket preferably comprises a pin gear sprocket.

The driven gear preferably has a larger diameter than the drive pinion. This arrangement provides for a torque-magnifying gear ratio and an efficient use of space.

The first drive pinion preferably comprises the first sprocket and the driven gear preferably comprises the series of rollers. This arrangement serves to maximise the number of rollers, and therefore serves to minimise the wear per roller and thus to prolong the life of the driven gear. Moreover, this arrangement provides for easier maintenance since it is likely that the sprocket will succumb to wear more quickly than the series of rollers, and the drive pinion is easier to replace than the driven gear.

The drive system is preferably switchable between the first configuration and a third configuration in which the first drive pinion is not capable of meshing with the driven gear. Thus, the drive system can be employed for ground taxiing when in the first configuration, and for take-off, landing, or other operations in which free rotation of the wheel is important, when in the third configuration. Alternatively, a clutch may be provided between the first drive pinion and the motor.

In some embodiments the drive system includes a second drive pinion and the motor is operable to rotate the second drive pinion via a second drive path, wherein the drive system is switchable between the first configuration and a second configuration in which the second drive pinion is capable of meshing with the driven gear to permit the motor to drive the driven gear via the second drive path, wherein one of the second drive pinion and the driven gear comprises a second sprocket and the other of the second drive pinion and the driven gear comprises the series of rollers, and wherein the first drive path has a higher gearing ratio than the second drive path.

The higher gear ratio of the first drive path provides for a slower rotational speed of the wheel during driving of the driven gear in the first configuration, whereas the lower gear ratio of the second drive path provides for a higher rotational speed of the wheel during driving of the driven gear in the second configuration. Thus, such embodiments enable the drive system to be used for low speed, high torque ground taxiing operations when in the first configuration and for high speed, low torque pre-landing spin-up operations when in the second configuration.

Preferably, the second drive pinion comprises the second sprocket and the driven gear comprises the series of rollers. This arrangement serves to maximise the number of rollers, and therefore serves to minimise the wear per roller and thus to prolong the life of the driven gear. Moreover, this arrangement provides for easier maintenance since it is likely that the sprocket will succumb to wear more quickly than the series of rollers, and the drive pinion is easier to replace than the driven gear.

The drive system is preferably switchable between the first and second configurations and a third configuration in which neither the first nor second drive pinions are capable of meshing with the driven gear. Thus, the drive system can be used for ground taxiing in the first configuration, for pre-landing spin-up in the second configuration, and for operations in which free rotation of the wheel is necessary, such as take-off, in the third configuration.

The present invention also provides an aircraft landing gear having a wheel and a drive system according to the first aspect, wherein the driven gear of the drive system is fixed to the wheel.

BRIEF DESCRIPTION OF THE DRAWINGS

Embodiments of the invention will now be described with reference to the accompanying drawings, in which:

FIGS. 8 A & B show isometric views of alternative driven gears of the drive system of FIG. 1;

FIGS. 15 A-C show isometric views of alternative driven gears for the drive systems of the first or second embodiments;

DETAILED DESCRIPTION OF EMBODIMENT(S)

A first embodiment of the invention is shown in FIGS. 1 to 8. In the illustrated embodiment the landing gear has two wheels, but the principles of the embodiment may be applied to landing gear with four or more wheels. The embodiment shows a main landing gear (i.e. a landing gear attached to wing structure or fuselage structure in the region of the wings), since the weight supported by the main landing gear is considered to provide the best traction between the wheels and the ground to enable reliable aircraft ground taxiing. However, the drive system of the present invention may alternatively be applied to a nose landing gear (i.e. a steerable landing gear towards the nose of the aircraft).

Figure 1:
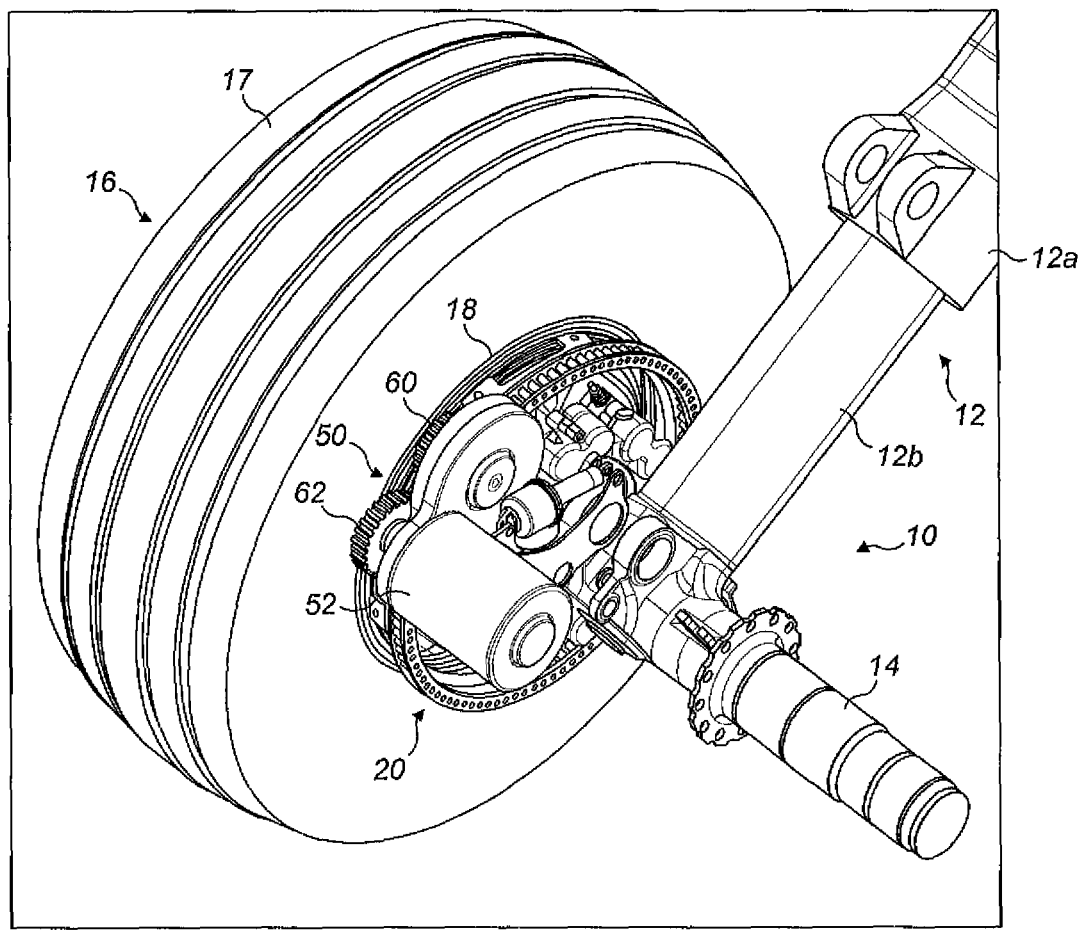
FIG. 1 shows an isometric view of a drive system according to a first embodiment.
Figure 2:
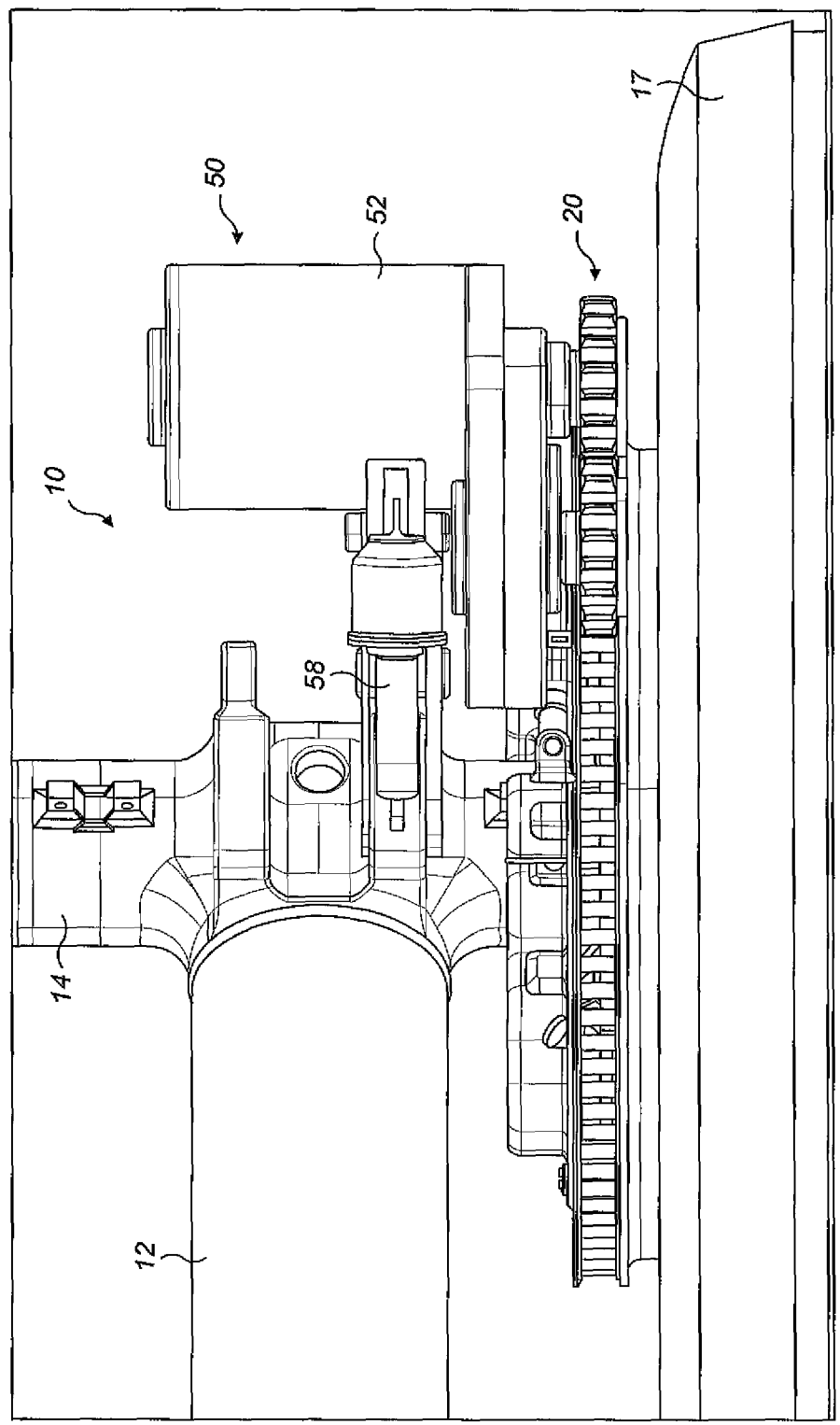
FIG. 2 shows a plan view of the drive system of FIG. 1.

The landing gear 10 includes a telescopic shock-absorbing main leg 12, including an upper telescopic part 12a (main fitting) and a lower telescopic part 12b (slider). The upper telescopic part 12a is attached to the aircraft fuselage or wing (not shown) by its upper end (not shown). The lower telescopic part 12b supports an axle 14 carrying a pair of wheels 16, one on either side of the main leg, (only one wheel 16 is shown in FIGS. 1 and 2, for clarity. The wheels 16 are arranged to rotate about the axle 14 to enable ground movement of the aircraft, such as taxiing or landing.

Each wheel 16 comprises a tyre 17 supported by a hub 18 (also known as a rim). A driven gear 20 is attached to the hub 18 so as to be rotatable with the wheel 16, the driven gear 20 comprising a roller gear 34 formed by two rigid annular rings 35 connected together by a series of rollers 36 extending around the rings to form a continuous track. The rollers 36 are each rotatable about a pin (not shown) which extends between the annular rings 35 to form a rigid connection between the annular rings 35. One of the annular rings 35 comprises a plurality of connection extension tabs 37 which provide a rigid connection to the hub 18.

FIGS. 7A-C and 8B illustrate an alternative arrangement for the driven gear 20 in which a roller chain 30 extends around a rigid annular extension ring 21. The extension ring 21 (or drum) is rigidly attached to the hub 18 via a plurality of extension tabs 22 so that it extends from an outer circumference of the hub 18 towards the leg 12. A roller chain 30 is fixed around the outer circumference of the extension ring 21 so that it forms a continuous track around the ring 21. FIG. 8A shows a detailed view of the extension ring 21 and roller chain 30 (also known as an attachment chain, or attachment roller chain), in which it can be seen that the roller chain 30 comprises multiple interlinked chain elements 31, each comprising a sub-assembly of two rollers 32 mounted on parallel axes. Each roller 32 is rotatable about a bush (not shown) which is itself mounted on a pin (not shown). Each chain element 31 is pivotally mounted to its neighbouring element by a pair of link elements 33 so that the rollers 32 are arranged to form a continuous track, or series, and each element 31 is thus designed to be able to rotate relative to its neighbour. Of course, since the roller chain 30 is fixed to the extension ring 21, the chain elements 31 are prevented from pivoting relative to one another.

The two possible arrangements for the driven gear 20 have in common that the rollers 32, 36 are each rotatable about a roller axis (not shown) which remains at a fixed distance from the axis of rotation of the wheel 16 (which corresponds to the axis of rotation of the extension ring 21 or annular rings 35). The roller gear arrangement of FIG. 8A may be preferred because it is possible to have a larger diameter pin for each roller 36 of the roller gear 34 than for each roller 32 of the chain 30, so that the shear strength of each roller-pin assembly can be much higher in the roller gear 34 than in the chain 30. This is because there is no requirement for an additional bush between the pin and roller 36 of the roller gear 34, since the pin itself acts as a bush.

A drive system 50 comprises a motor 52 which rotates an input shaft 54 which itself rotates first 60 and second 62 output sprockets via a gearbox 70. The first 60 and second 62 sprockets are each wheel-type sprockets with radially-extending teeth which can interlock with the rollers 32 of the roller chain 30 (or rollers 36 of roller gear 34). Although the figures only show features of the drive system 50 for driving one of the wheels 16, it is intended that these features be mirrored for the other wheel 16. That is, it is intended that one drive system 50 will be provided for each wheel 16. For a landing gear 10 with four or more wheels 16, a drive system 50 may be provided for each of the wheels 16, or for only two of them. In embodiments in which only two of the wheels 16 are provided with drive systems 50, it may be necessary to provide further motors (not shown) to achieve pre-landing spin-up of the un-driven wheels, with ground taxiing being accomplished by the two drive systems 50. In other embodiments it may be possible to have one motor 52 shared between two drive systems 50. That is, the motor 52 may be arranged to rotate the input shaft 54 of each drive system.

Figure 3:
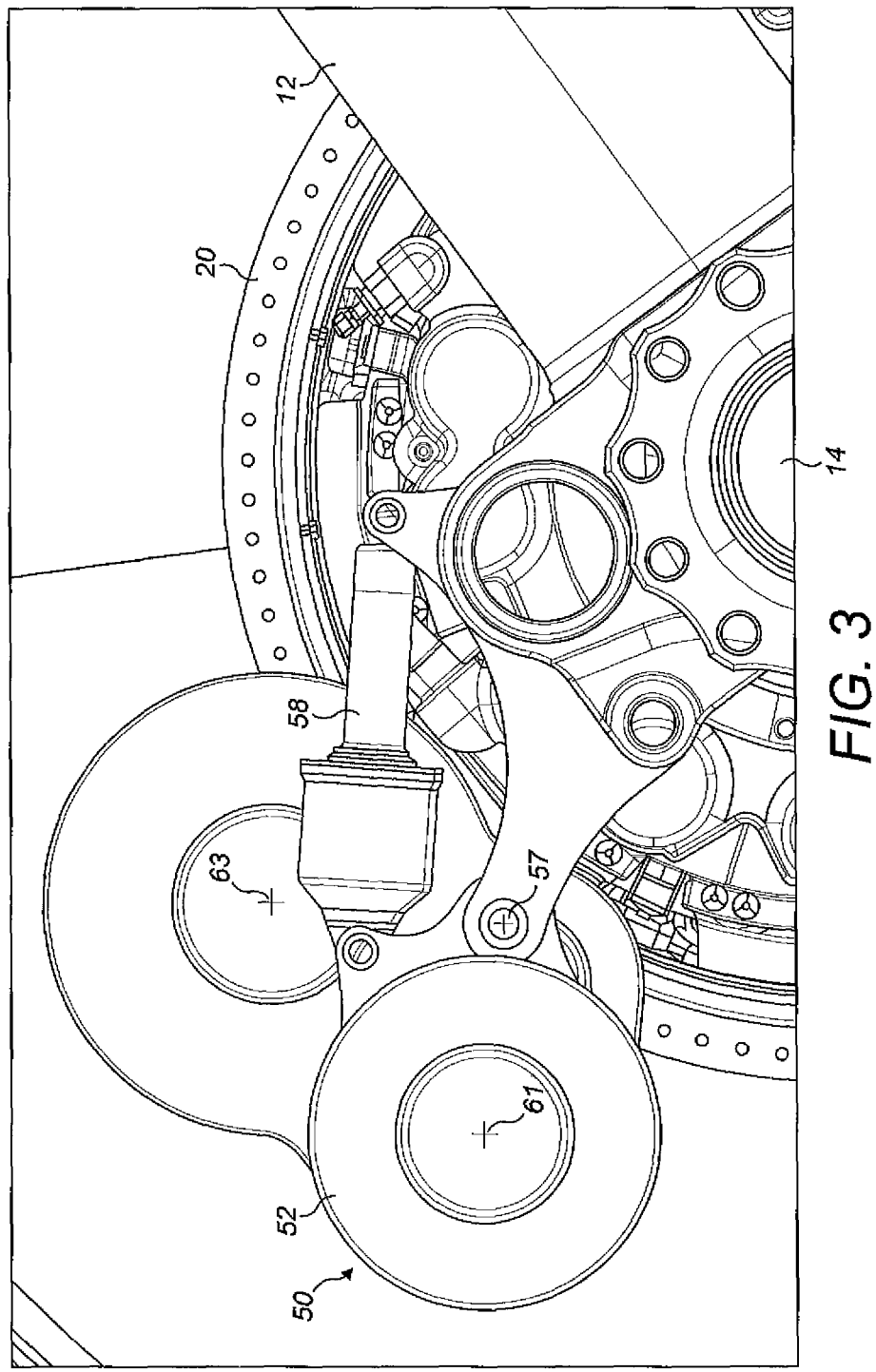
FIG. 3 shows a side view of the drive system of FIG. 1.
Figure 4:
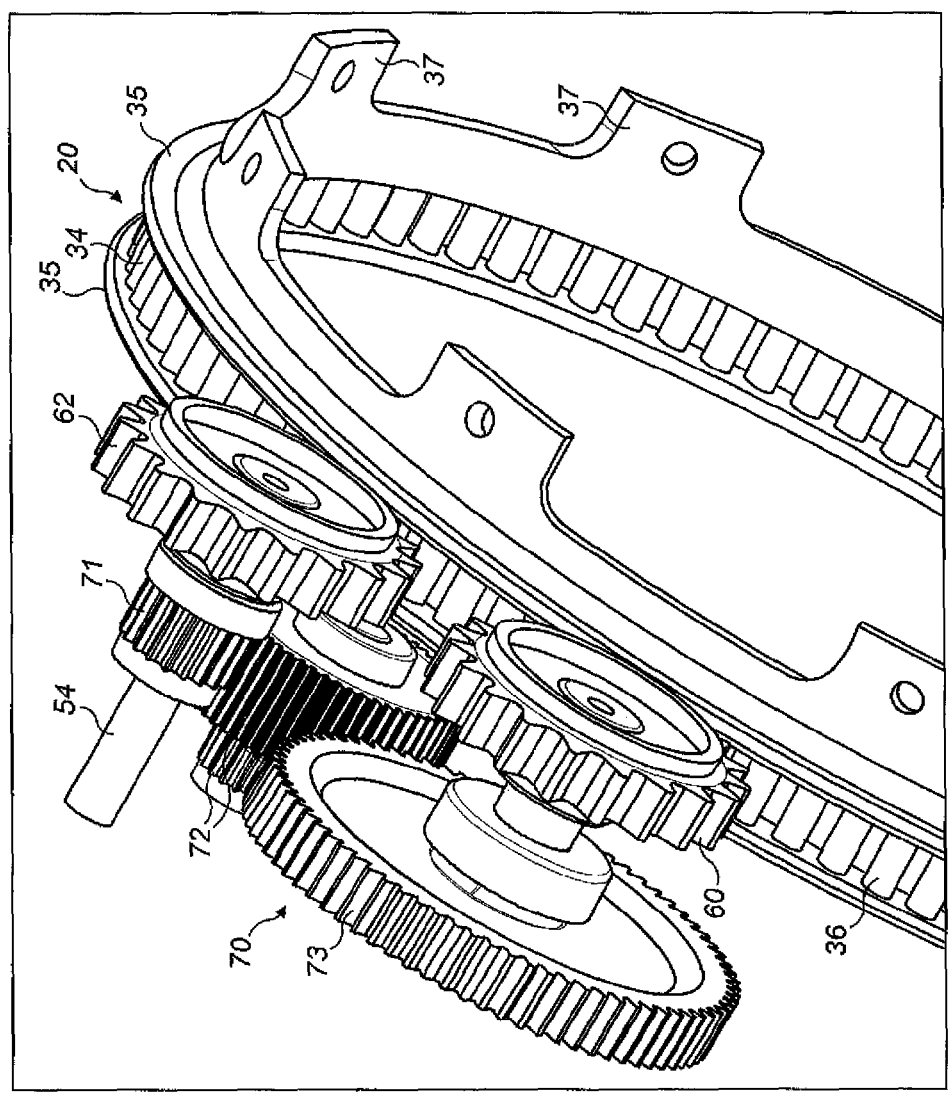
FIG. 4 shows an isometric view of selected components of the drive system of FIG. 1.
Figure 5:
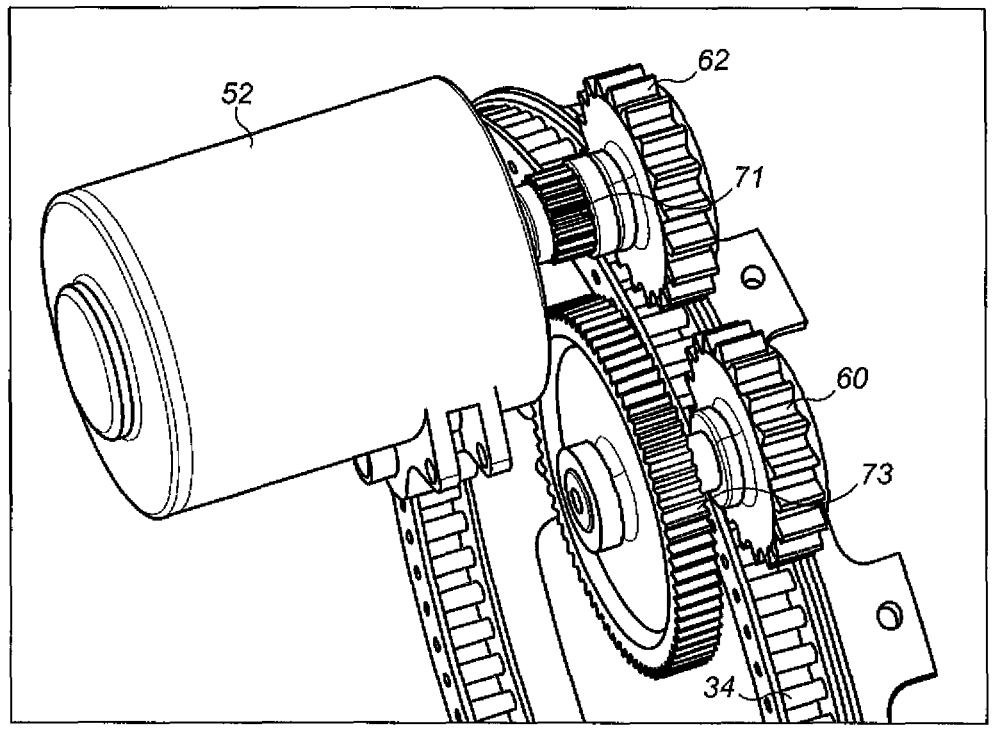
FIG. 5 shows another isometric view of selected components of the drive system of FIG. 1.
Figure 6:
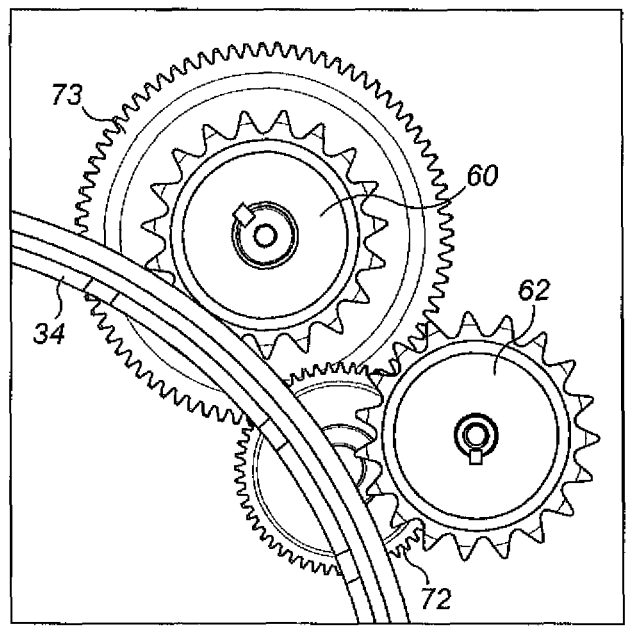
FIG. 6 shows a side view of selected components of the drive system of FIG. 1.
Figure 7C:
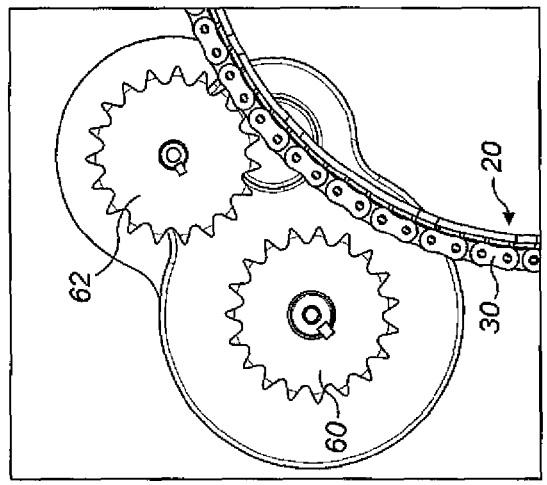
FIGS. 7 A-C show side views of selected components of the drive system of FIG. 1 with an alternative driven gear, the drive system being shown in a ground taxi configuration (A), neutral configuration (C), and spin-up configuration (B)
Figure 7B:
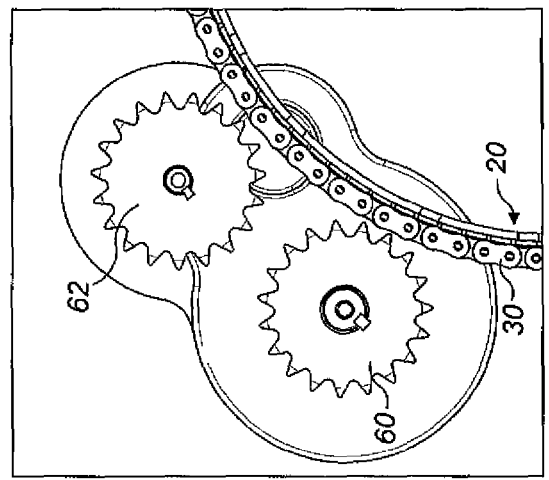
Figure 7A:
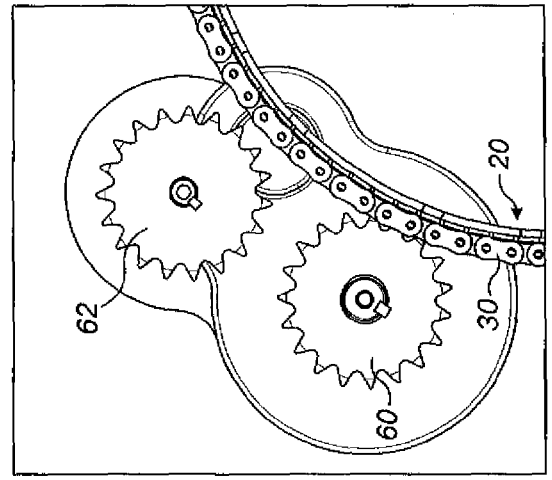
Figure 9:
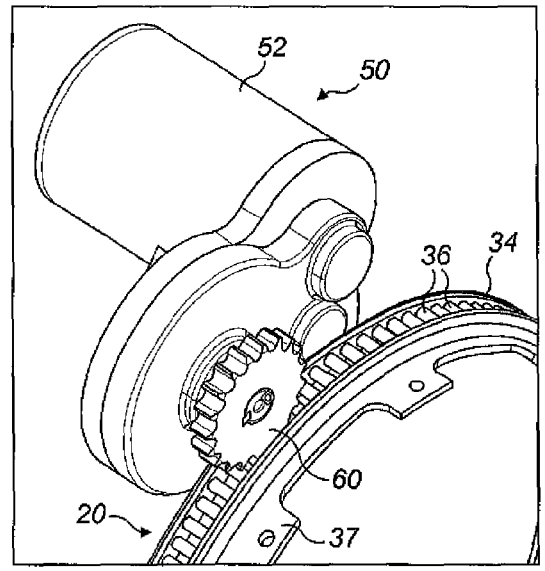
FIG. 9 shows an isometric view of a drive system according to a second embodiment, with some parts omitted for clarity.
Figure 10:
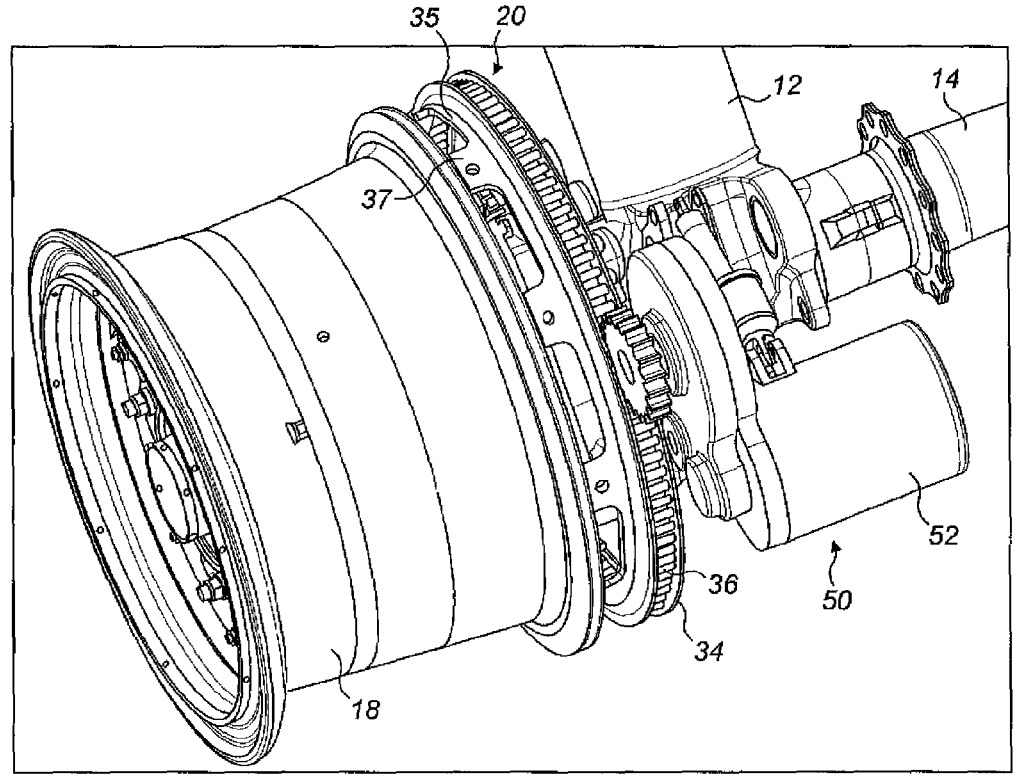
FIG. 10 shows an isometric view of the drive system of FIG. 9.
Figure 11:
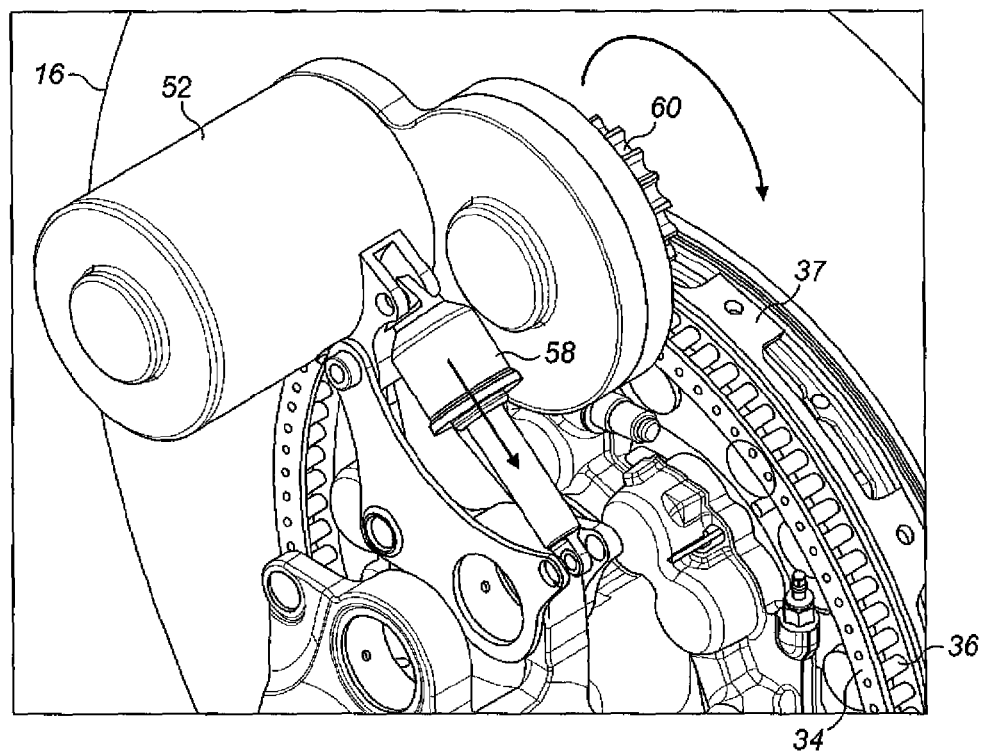
FIG. 11 shows an isometric view of the drive system of FIG. 9.
Figure 12:
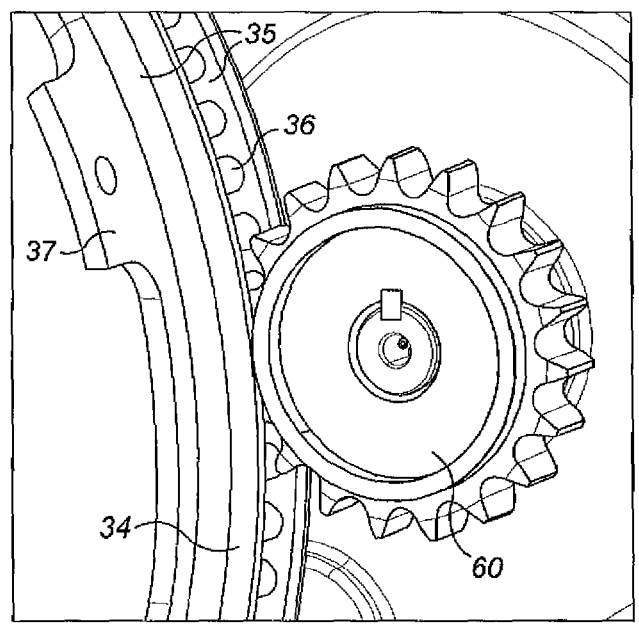
FIG. 12 shows a detail view of the drive system of FIG. 9.

The drive system 50 is supported by a bracket 56 which is rigidly connected to the axle 14 of the landing gear and pivotally connected to the motor 52 about a pivot axis 57 which is generally located between respective rotational axes 61, 63 of the sprockets 60, 62 (see FIG. 3). The drive system 50 may, alternatively be mounted on the upper telescopic part 12a (main fitting) or lower telescopic part 12b (slider). A linear actuator 58, such as a direct-drive roller-screw electro-mechanical linear actuator, extends between the bracket 56 (at an end nearest the axle 14) and the motor 52. Thus, linear movement of the actuator 58 is translated to rotational movement of the drive system 50. Because of the location of the pivot axis 57 between the axes 61, 63 of the sprockets 60, 62, the drive system 50 can be rotated between a position in which only the first sprocket 60 engages the roller chain 30 (FIG. 7A) and a position in which only the second sprocket 62 engages the roller chain 30 (FIG. 7C). In a position between these two extremes neither sprocket 60, 62 engages the roller chain 30 (FIG. 7B). This pivoting arrangement ensures that it is not possible for both the first sprocket 60 and second sprocket 62 to engage the roller chain 30 at the same time.

The gearbox 70 comprises first 71, second 72, and third 73 cooperating toothed gears. The first gear 71 is fixed to the input shaft 54 so that it rotates with that shaft. The third gear 73 is connected to the first sprocket 60, and the second gear 72 interconnects the first 71 and third 73 gears. Thus, the first, second and third gears provide a first drive path between the input shaft 54 and the first sprocket 60. In the illustrated embodiment the gearing ratio of the second drive path is 40:1. The input shaft 54 is directly connected to the second sprocket 62 to provide a second drive path which effectively bypasses the gearbox. In the illustrated embodiment the gearing ratio of the second drive path is 5:1, i.e. much lower than that of the first drive path. Thus, the drive system 50 is arranged to have three configurations: a low speed, high torque taxiing configuration in which the motor 52 drives the wheel 16 via the first drive path and first sprocket 60 (FIG. 7A); a high speed, low torque spin-up configuration in which the motor 52 drives the wheel 16 via the second drive path and second sprocket 62 (FIG. 7c); and a neutral (disconnected) configuration in which neither the first sprocket 60 nor the second sprocket 62 engages the roller chain (FIG. 7B). The taxiing configuration is suitable for accelerating the wheel 16 to speeds of 175 rpm (equivalent to 20 knots) during ground taxing, while the spin-up configuration is suitable for accelerating the wheel 16 to rotational speeds of 1400 rpm (equivalent to 160 knots ground speed) prior to touch down on landing.

The motor 52, gearbox 70 and first and second sprockets 60, 62 are encased within a housing to protect the components therein from environmental contamination by debris etc which may cause malfunction.

In the taxing configuration the linear actuator 58 (which may be back-drivable) may be torque controlled (or current controlled) to apply a substantially constant load between the first sprocket 60 and the driven gear 20, thereby allowing for some deformation of the various component parts of the drive system 50 while at the same time preventing unwanted separation. The linear actuator 58 may be similarly controlled in the spin-up configuration, although separation loads will be lower during spin-up than during ground taxiing so this should be reflected in the control logic. In the neutral configuration the linear actuator 58 may be position controlled to achieve the neutral position whereby neither sprocket is engaged with the driven gear 20. An electromechanical brake (not shown), or other similar locking device, may be integrated within the actuator 58 to lock the actuator in the neutral configuration.

A second embodiment of the invention is shown in FIGS. 9 to 12. This embodiment is similar to the first embodiment (like parts being labelled with the same reference numerals for convenience), with the only difference being in the drive system 50. That is, the second embodiment includes only a first sprocket 60 and no second sprocket 62. Thus, there is only one sprocket 60 able to mesh with the driven gear 20 to drive the wheel 16, and only one drive path between the motor 52 and the first sprocket 60. In the drawings the driven gear 20 is shown as a roller gear 34 as described above in relation to FIG. 8A, but the chain 30 and extension ring 21 arrangement of FIG. 8B would be a suitable alternative.

The actuator 58 is arranged to rotate the drive system 50 between a position in which the first sprocket 60 engages the roller chain 30 (as shown in FIGS. 9 to 12) and a position in which the first sprocket 60 is not able to engage the roller chain 30. In this way, the drive system 50 has two possible configurations: a low speed, high torque taxiing configuration in which the motor 52 drives the wheel 16 via the first drive path and first sprocket 60; and a neutral (disconnected) configuration in which neither the first sprocket 60 nor the second sprocket 62 engages the roller chain.

Thus, the drive system 50 of the second embodiment is suitable for only ground taxiing operations (or could be modified to be suitable for only pre-landing spin-up operations), while the drive system of the first embodiment is suitable for both ground taxiing and pre-landing spin-up operations.

Figure 13:
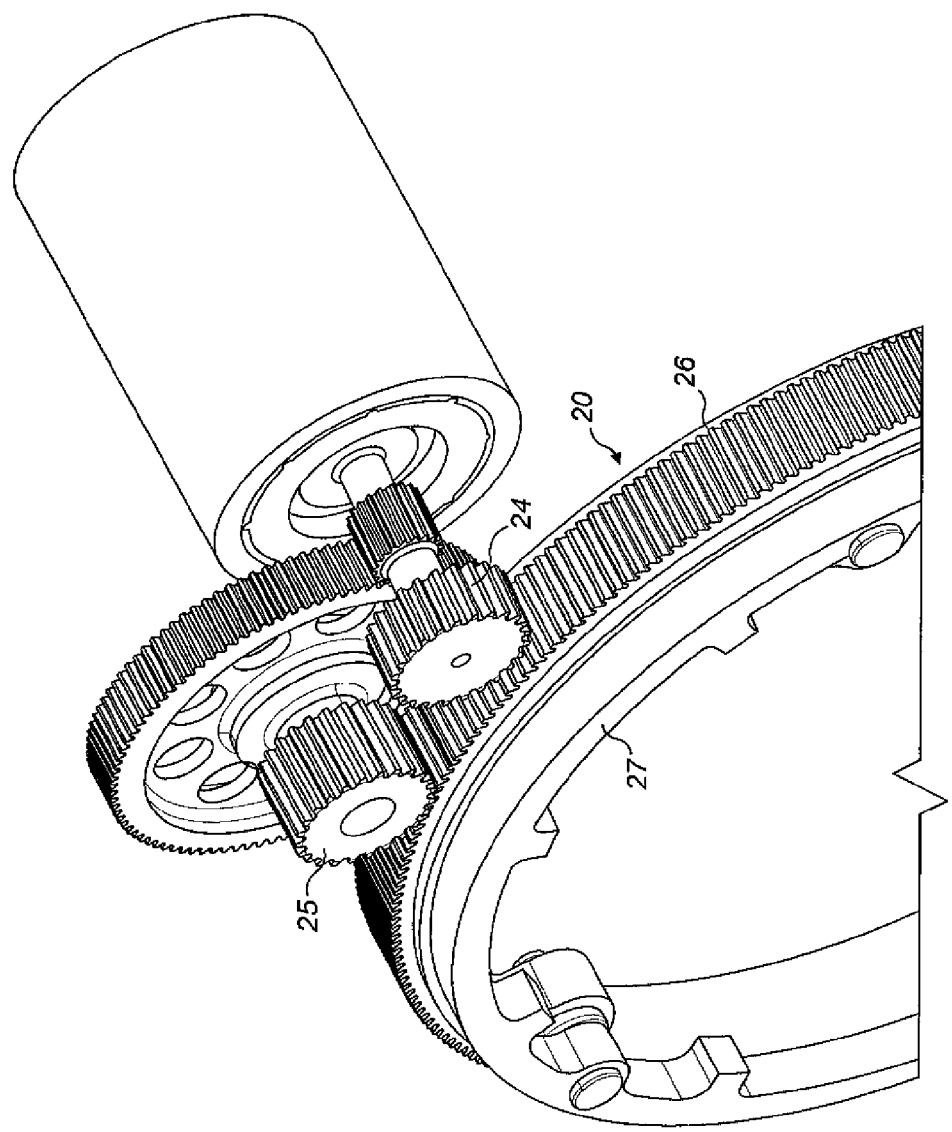
FIG. 13 shows a detail view of an alternative drive pinion and driven gear suitable for the first and second embodiments.

In both the first and second embodiments one or each of the first sprocket 60 and second sprocket 62 can be replaced with a spur gear (not shown) or other type of toothed gear, and the driven gear 20 can be replaced with a ring gear (not shown) or other type of toothed gear. Such an arrangement is illustrated in FIG. 13, which shows a first spur gear 24 in place of the first sprocket 60 and a second spur gear 25 in place of the second sprocket 62. The first 24 and second 25 spur gears meshing with a ring gear 26 which is fixed to the wheel (not shown) via a flexible interface 27 to provide the driven gear 20. The flexible interface 27 serves to isolate the ring gear 26 from wheel deformation loads. The toothed gears 24, 25, 26 can be arranged to mesh together to achieve the taxiing and/or spin-up configurations in the same way as previously described with respect to the first and second embodiments.

Figure 14C:
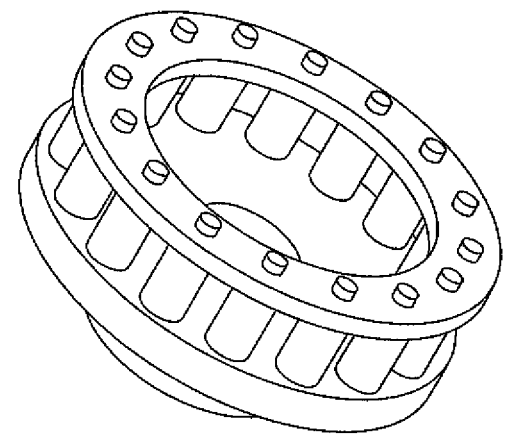
FIGS. 14 A-C show isometric views of alternative drive pinions for the drive systems of the first or second embodiments.
Figure 14B:
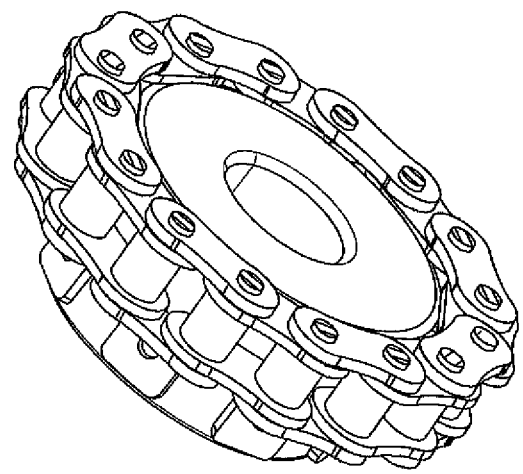
Figure 14A:
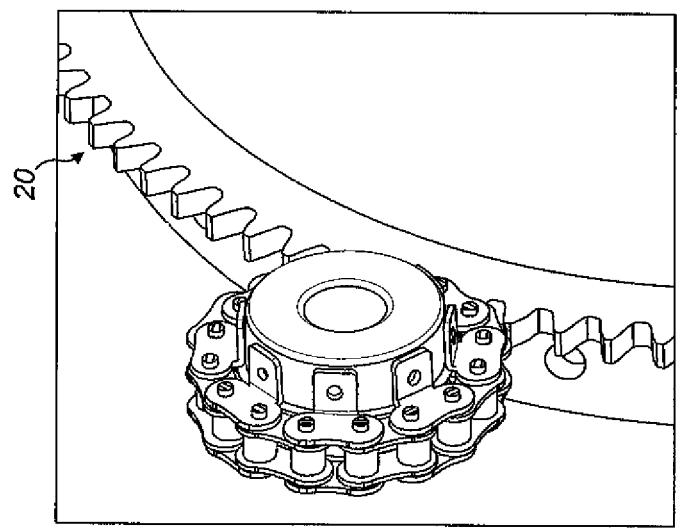

In both the first and second embodiments one or each of the first sprocket 60 and the second sprocket 62 can be replaced with a roller gear similar to that illustrated in FIG. 8b, or a roller chain fixed around a drum similar to that illustrated in FIG. 8a. Such an arrangement is illustrated in FIGS. 14 A & B, which show an embodiment in which the first sprocket (first drive pinion) is replaced by a roller chain (attachment chain) fixed around a drum, and FIG. 14 C, which shows an alternative example of a roller gear suitable as a first drive pinion. In such alternative embodiments the driven gear 20 comprises a sprocket of the type illustrated in the figures for the first and second sprockets, as shown in FIG. 14A. That is, the principle of achieving drive via meshing between a sprocket and roller gear/roller chain can be applied when the driven gear comprises the sprocket and the drive pinion comprises the roller gear/roller chain, and vice versa.

In both the first and second embodiments the roller gear may be constructed in any of a plurality of different ways, including those illustrated in FIGS. 15 A, B & C. Thus, the roller gear may include rollers 36 which are each rotatable about a pin which is fixed at only one end to a rigid annular ring 35 (FIG. 15A). Alternatively, each pin may be fixed at each end to one of a pair of rigid annular rings 35 (FIGS. 15B & 15C). The connection extension tabs 37 shown in FIGS. 15A and 15B may be replaced with a continuous extension rim 37A as shown in FIG. 15C, in order to improve the stiffness of the roller gear.

Figure 16A:
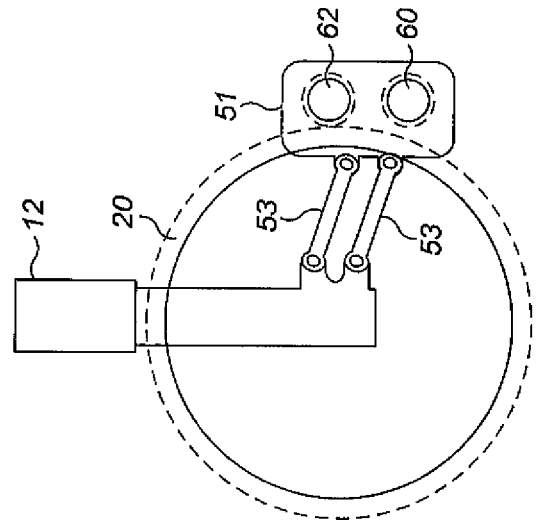
FIGS. 16 A-C show schematic side views of an alternative actuation system for the drive systems of the first or second embodiments.
Figure 16B:
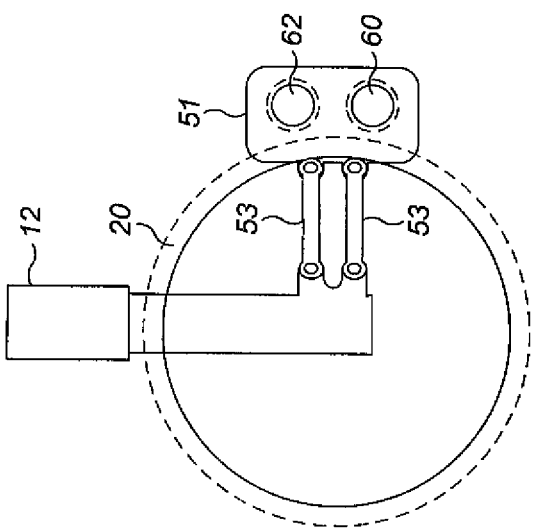
Figure 16C:
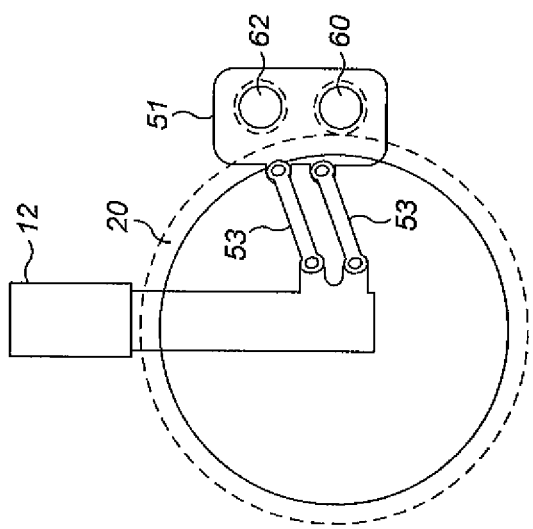
Figure 17:
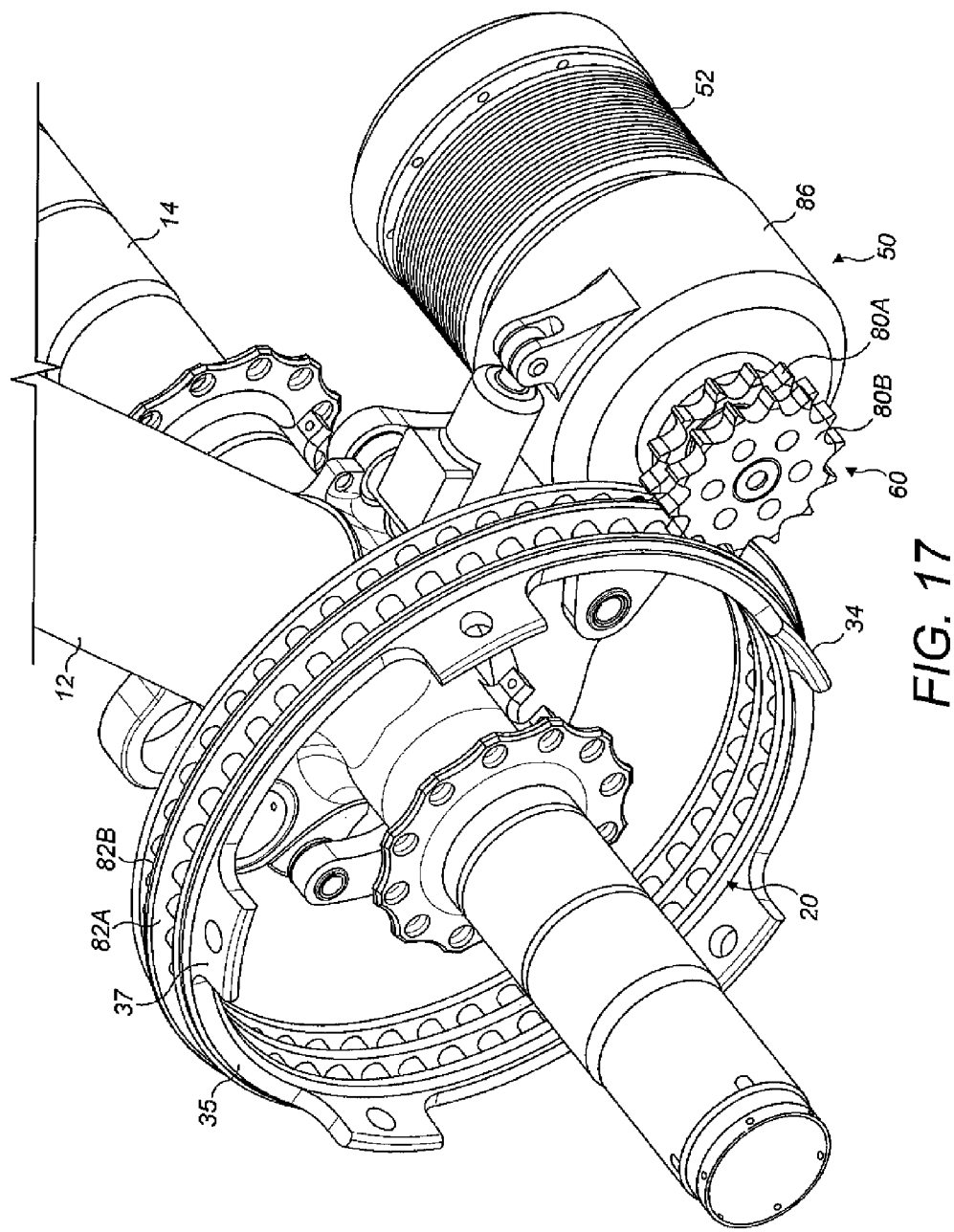
FIG. 17 shows an isometric view of a drive system according to a third embodiment, with some parts omitted for clarity.
Figure 18:
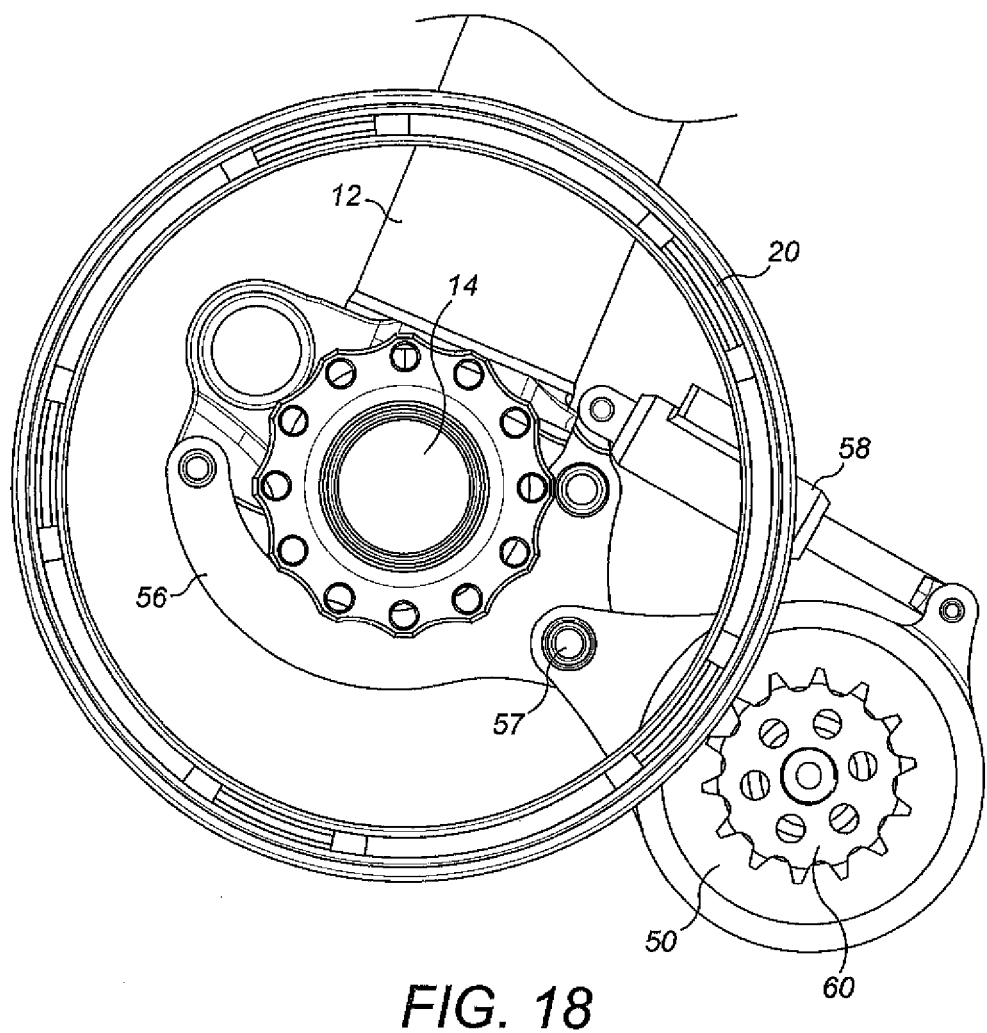
FIG. 18 a side view of the drive system of FIG. 17 in a disengaged position.

FIGS. 16A-C illustrate an alternative arrangement to the assembly provided by the linear actuator 58 and pivoting bracket 56, described above. In this alternative arrangement the first 60 and second 62 sprockets are both mounted on a common mounting plate 51 which is connected to the landing gear leg 12 by a pair of pivotable arms 53. The arms 53 may be pivotably connected to either the upper telescopic part 12a (main fitting) or the lower telescopic part 12b (slider) of the landing gear 10. The 'parallelogram' arrangement of the arms 53 enables the mounting plate 51 to be translated relative to the driven gear 20 without being subject to any rotation. Thus, the first 60 and second 62 sprockets can be moved between the taxiing configuration (FIG. 16A), the neutral configuration (FIG. 16B), and the spin-up configuration (FIG. 16C).

In both the first and second embodiments each of the first and second sprockets 60, 62 may comprise multiple co-axial sprockets, each sprocket being arranged to mesh with one of multiple co-axial rings of rollers comprised in the driven gear 20 in order to increase the load rating of the assembly. For example, in the first embodiment the first and second sprockets 60, 62 may each comprise a pair of co-axial sprockets and the driven gear 20 may comprise a corresponding pair of chains 30, whereby a respective one of the pair of co-axial sprockets is arranged to mesh with a respective one of the chains 30. The multiple co-axial sprockets and multiple co-axial rings of rollers will be described in greater detail in the following with reference to a third embodiment of the invention.

The third embodiment of the invention is shown in FIGS. 17 to 22. This embodiment is similar to the second embodiment (like parts being labelled with the same reference numerals for convenience), with the main differences being in the drive system 50 and in the driven gear 20. That is, in the third embodiment the first pinion (sprocket) 60 comprises multiple co-axial sprockets 80A, 80B and the driven gear 20 comprises multiple co-axial rings of rollers 82A, 82B arranged as a roller gear 34. The respective co-axial sprockets 80A, 80B are able to mesh with the co-axial rings of rollers 82A, 82B.

The third embodiment, like the second embodiment, includes only a first sprocket 60 and no second sprocket 62. Thus, there is only one sprocket 60 able to mesh with the driven gear 20 to drive the wheel 16, and only one drive path between the motor 52 and the first sprocket 60. Thus, the drive system 50 of the third embodiment is suitable for only ground taxiing operations (or could be modified to be suitable for only pre-landing spin-up operations), while the drive system of the first embodiment is suitable for both ground taxiing and pre-landing spin-up operations. However, the drive system of the first embodiment having first and second sprockets can be modified such that each of the first and second sprockets comprise multiple co-axial sprockets able to mesh with a driven gear comprising multiple co-axial rings of rollers. There may also be merit in using the first sprocket 60 of the third embodiment to rotate the wheel at taxiing speeds for pre-landing operations.

In the third embodiment the drive system 50 is capable of driving one of the wheels 16 of the two wheel landing gear, whilst the other wheel is not driven. For landing gear with more than two wheels a plurality of the drive systems 50 may be provided.

The drive system 50 of the third embodiment comprises a motor 52 coupled to an epicyclic gearbox 86 which rotates the first sprocket 60. The axis of rotation of the first sprocket 60 is co-axial with the motor axis of rotation. Whilst the overall axial length of the drive system 50 of the third embodiment is longer than the drive systems of the first and second embodiments, due to the eplicyclic gearbox 86, this is not problematic as only one wheel 16 of the landing gear is driven. By contrast, in the first and second embodiments, the axial length of drive system is comparably shorter in order that both wheels 16 of the landing gear may be driven by respective drive systems.

Of course, an epicyclic gearbox may be used instead of the parallel axis gearboxes described in the first and second embodiments, particularly if only one of the wheels 16 of the landing gear is driven. Alternatively, a parallel axis gearbox may be used instead of the epicyclic gearbox in the third embodiment. The epicyclic gearbox is neater in design terms but the parallel axis gearbox allows greater freedom in design to adjust the angles between the pinion axis of rotation and the pivot axis 57.

The motor 52 and epicyclic gearbox 86 are encased within a housing to protect the components therein from environmental contamination by debris etc which may cause malfunction.

The drive system 50 is supported by a bracket 56 which is rigidly connected to the lower telescopic part 12b (slider) of the landing gear and pivotally connected to the motor 52 about a pivot axis 57. The drive system 50 may alternatively be mounted on the upper telescopic part 12a (main fitting) or axle 14. The bracket 56 includes an aperture 84 providing access to a jacking point at the base of the slider. A linear actuator 58, such as a hydraulic actuator, an electro-mechanical actuator (EMA), or an electro-hydraulic actuator (EHA), extends between the bracket 56 (at an end nearest the axle 14) and the motor 52. Thus, linear movement of the actuator 58 is translated to rotational movement of the drive system 50.

Figure 19:
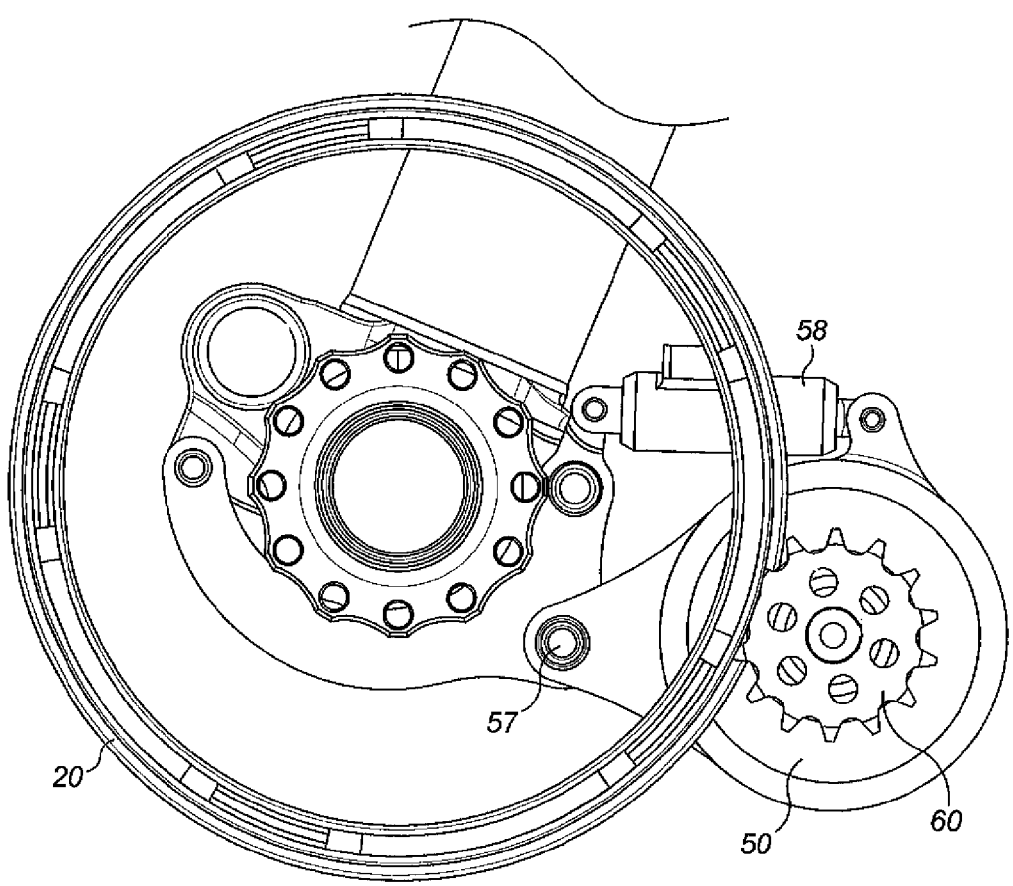
FIG. 19 a side view of the drive system of FIG. 17 in an engaged position.
Figure 20:
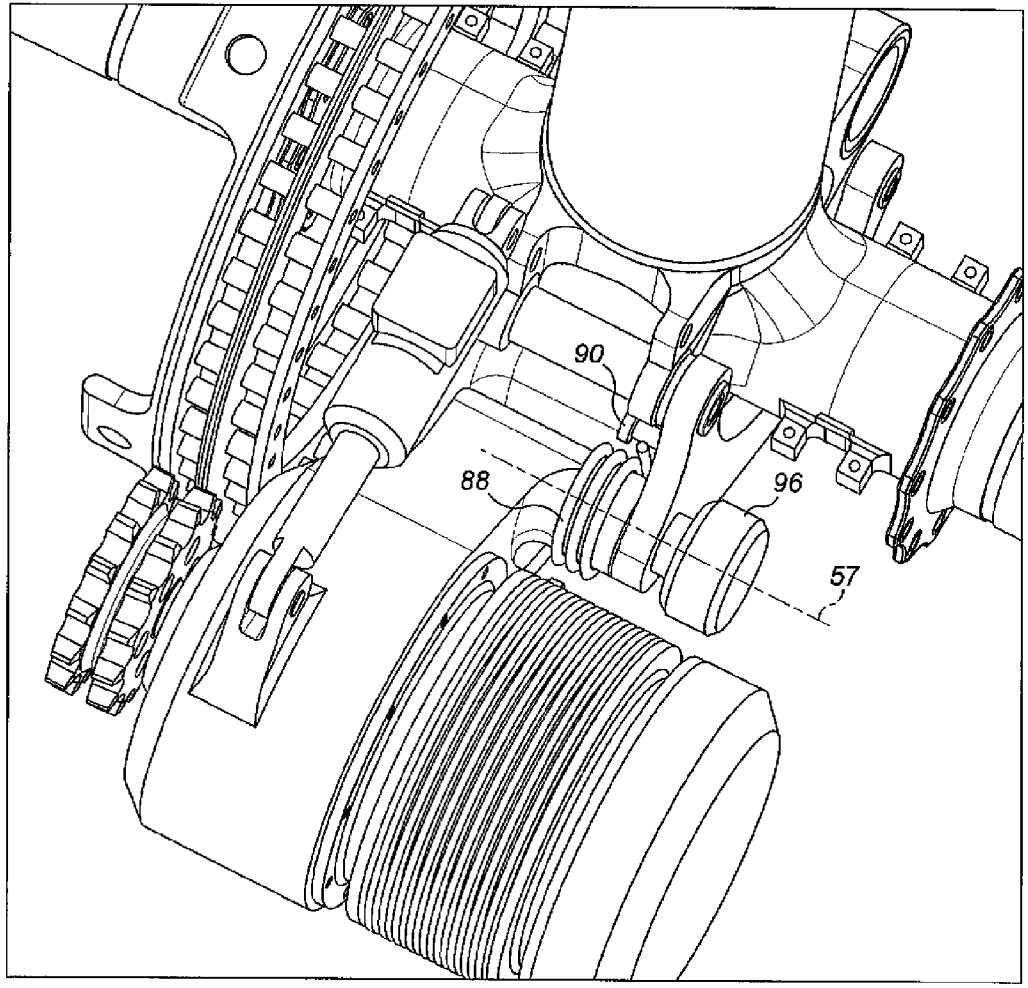
FIG. 20 shows an isometric view of the drive system of FIG. 17.

The actuator 58 is arranged to rotate the drive system 50 between a position in which the first sprocket 60 engages the roller gear 34 (as best shown in FIG. 19) and a position in which the first sprocket 60 is not able to engage the roller gear 34 (as best shown in FIG. 20). In this way, the drive system 50 has two possible configurations: a low speed, high torque taxiing configuration in which the motor 52 drives the wheel 16 via the first drive path and first sprocket 60; and a neutral (disconnected) configuration in which the first sprocket 60 does not engage the roller gear 34.

The hydraulic actuator 58 (shown) may be preferred since the load imparted onto the driven gear 20 by the sprocket 60 in the engaged configuration may be more compliant than with either an EHA or EMA. This compliance may beneficially provide load control and damping to avoid over-loading the driven gear and sprocket engagement.

Figure 21:
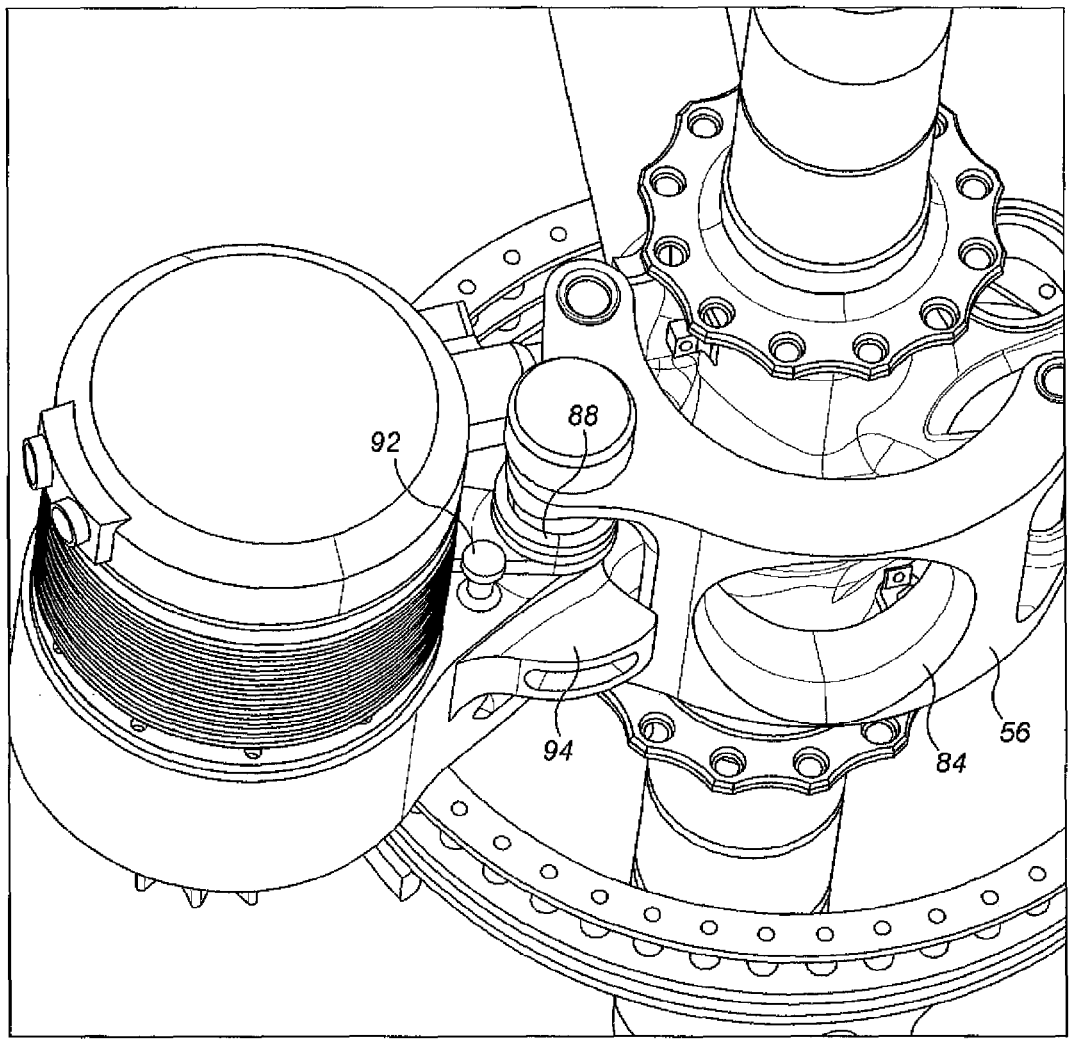
FIG. 21 shows an isometric view of the drive system of FIG. 17.

As best shown in FIGS. 20 and 21 the drive system 50 is biased to the neutral (disconnected) configuration, firstly by gravity (when the aircraft is not inverted) and secondly by a torsion spring 88. The spring 88 is substantially formed as a coil centred around the pivot axis 57. The spring 88 has a first flying end which bears against a pin 90 projecting from the bracket 56 and has a second flying end which bears against a pin 92 projecting from the drive system 50. Under the biasing forces of the spring and gravity an end stop 94 extension on the drive system 50 bears against the bracket 56 on the underside of the landing gear to prevent over rotation of the drive system 50 about the pivot axis 57. In addition, the actuator 58 may include a lock down device to hold the drive system in the disconnected configuration during take-off, landing and flight.

The linear actuator 58 (which may be back-drivable) may be torque controlled (or current controlled) to apply a substantially constant load between the first sprocket 60 and the driven gear 20, thereby allowing for some deformation of the various component parts of the drive system 50 while at the same time preventing unwanted separation. The load rating takes account of vibration and shock loads, and the geometry/kinematics of the system can be optimized to further reduce loads on actuator and/or bearings.

The actuator 58 may be force controlled using the motor torque demand to comply with deflections/deformation of the final transmission between the first sprocket 60 and driven gear 20. Force feedback may be used to control the actuator position in closed loop. Force feedback may not be required and the actuator may be controlled in open loop, limiting sensor requirement and improving system reliability. The load may be set as a function of the motor torque plus a margin to ensure secure meshing engagement but so as to limit wear. An actuator position sensor may be needed to confirm whether the actuator is engaged or disengaged. A rotary position sensor 96, such as a rotary variable differential transformer, or a linear position sensor (not shown), such as a linear variable differential transformer, embedded within the actuator may be used by the control loop of the actuator during engagement.

During engagement, the inertia (speed) of roller-gear 34 and sprocket 60 would be matched using available motor speed feedback (for sprocket speed) and either the aircraft tachometer (not shown) or an independent roller-gear speed sensor, such as an inductive sensor using the rollers as target, may be used.

Figure 22D:
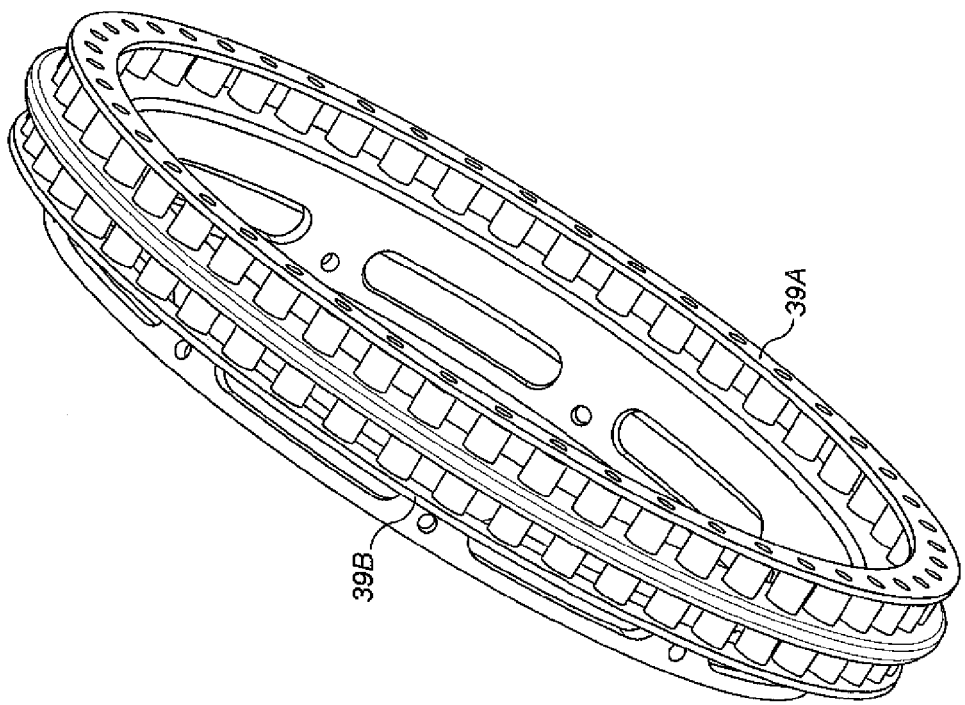
FIGS. 22 A-D show the construction of the driven gear of the drive system of FIG. 17.
Figure 22C:
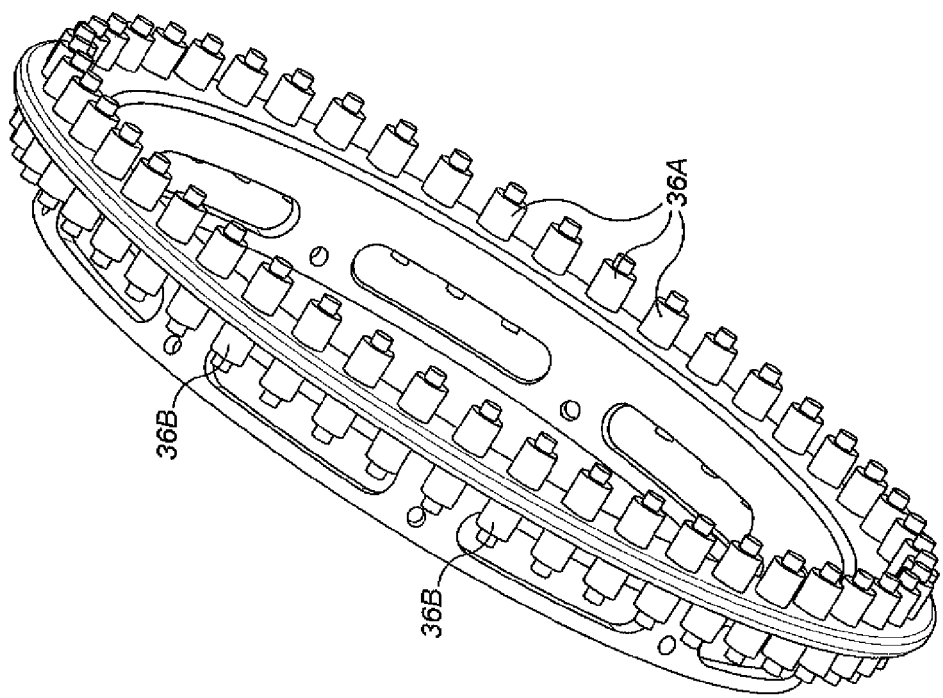

The driven gear 20 is shown in detail in FIGS. 22 A-D. The driven gear 20 comprises a roller gear 34 formed by a rigid annular ring 35. A flange forming a continuous extension rim 37B with cut outs projects axially from the inner diameter of the annular ring 35. Alternatively, the tabs 37 (shown in FIG. 4) or the extension rim 37A (shown in FIG. 15C) may be used. The continuous extension rim 37B provides a rigid connection to the hub 18.

A series of pins 38 project from both sides of the annular ring 35. The pins are fixed to the annular ring. In the example shown in FIG. 22 the pins 38 each extend through the annular ring 35 and the centre of each pin, between its opposing ends, is fixed to the annular ring. Alternatively, two series of pins may be provided, with a first series of pins projecting from one side of the annular ring and a second series of pins projecting from the other side of the annular ring. The pins are fixed at one end to the annular ring.

A first series of rollers 36A rotatably supported by the pins 38 is provided on one side of the annular ring 35, and a second series of rollers 36B rotatably supported by the pins is provided on the other side of the annular ring. Each series of rollers 36A, 36B extends around the annular ring to form a continuous track.

First and second lateral annular rings 39A, 39B sandwich the first and second series of rollers 36A, 36B. The pins 38 supporting the first series of rollers 36A extend between the annular ring 35 and the first lateral annular ring 39A, and the pins 38 supporting the second series of rollers 36B extend between the annular ring 35 and the second lateral annular ring 39B. The annular ring 35 therefore forms a central spine for supporting the pins which are cantilevered off the central spine.

The pins 38 may be press fit, threaded, or otherwise fixed to the annular ring 35. Either all or only some of the pins may be fixed to the lateral annular rings 39A, 39B, e.g. by bolting. Those pins that are not fixed to the lateral annular rings may have ends seated in respective recesses in the lateral annular rings.

As in the first and second embodiments, the rollers are each rotatable about a roller axis (not shown) which remains at a fixed distance from the axis of rotation of the wheel 16, which corresponds to the axis of rotation of the annular ring 35. The first and second series of rollers 36A, 36B form the multiple co-axial rings of rollers 82A, 82B. The respective co-axial sprockets 80A, 80B of the first sprocket 60 are able to mesh with the co-axial rings of rollers 82A, 82B. The groove between the sprockets 80A, 80B may be in rolling contact with the outer diameter of the central spine (annular ring 35) of the roller gear 34. The rolling contact is preferably at the pitch radius of the rollers.

Whilst in the example of the third embodiment illustrated the driven gear 20 comprising the roller gear 34 has two co-axial rings of rollers 82A, 82B, it will be appreciated that three or more co-axial rings of rollers may alternatively be provided. This may be achieved, for example, by providing a plurality of the annular rings 35 with pins carrying rollers extending between the annular rings 35. Of course, if more than two co-axial rings of rollers are provided then the first sprocket 60 would have a respective number of co-axial sprockets for meshing with the co-axial rings of rollers.

Doubling the number of series of co-axial roller rings/sprockets from one (as in the first and second embodiments) to two approximately halves the load on each roller ring/sprocket. For a given pitch of the meshing roller gear/sprocket the applicable loads will be limited. Whilst a larger pitch could carry a correspondingly greater torque load the gearing ratio of the roller gear/sprocket would decrease. The gearing ratio to provide the required taxiing speed is therefore likely to be the limiting factor in determining how many co-axial series of rollers/sprockets are required for a given motor torque. The torque rating of the motor in the illustrated example of the third embodiment is approximately twice that of the motors used in the illustrated examples of the first and second embodiments since in the third embodiment only one wheel per landing gear is driven whereas in the first and second embodiments two wheels per landing gear are driven.

Figure 23:
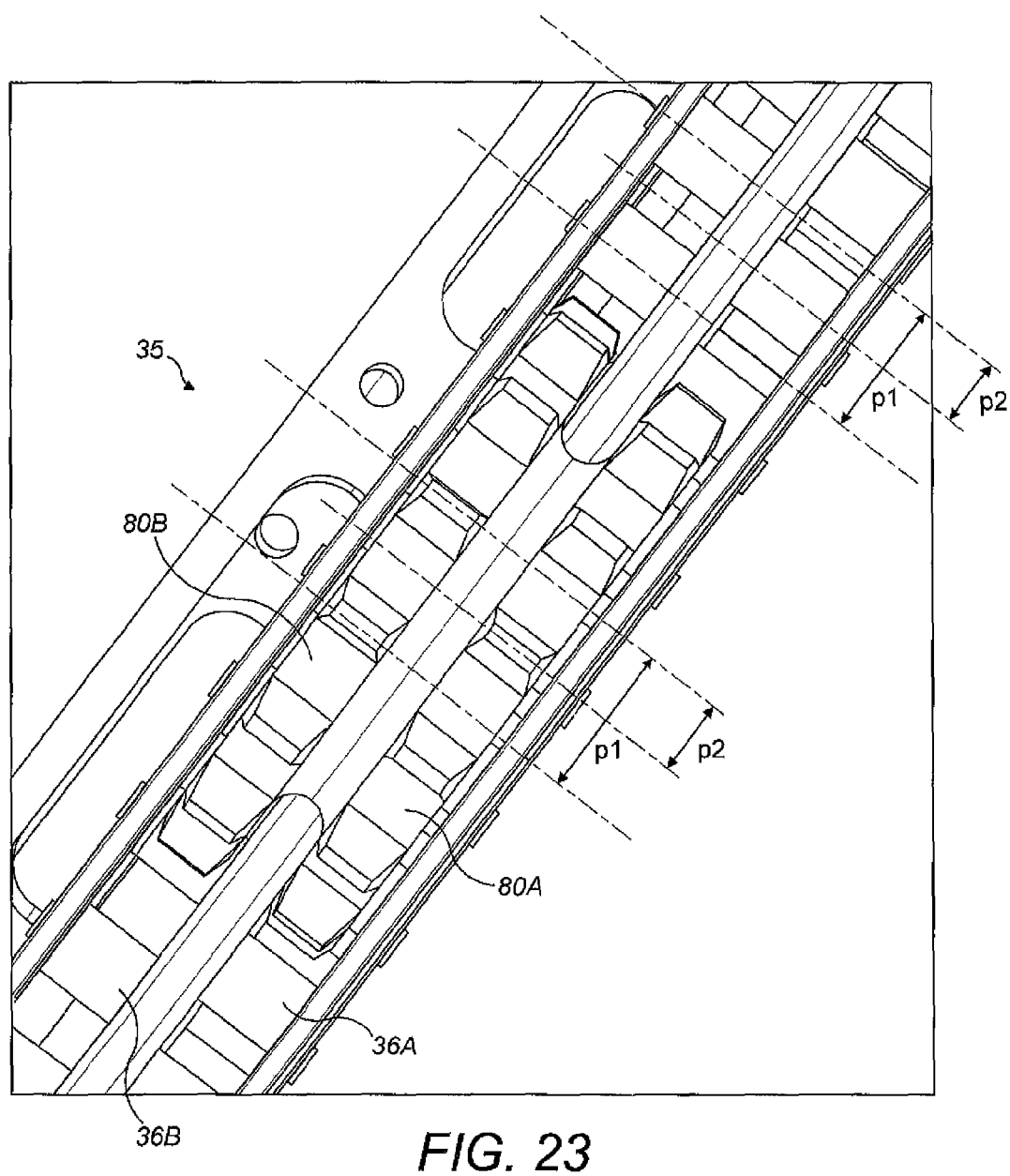
FIG. 23 shows an alternative example of the third embodiment in which the rollers/sprockets are de-phased.

Whilst in the example of the third embodiment illustrated in FIGS. 17 to 22 the co-axial rings of rollers are arranged symmetrically (i.e. in phase) on either side of the annular ring 35, the multiple series of rollers may be out of phase, as shown in FIG. 23. The first series of rollers 36A are offset by an angular rotation about the axis of rotation of the annular ring 35 with respect to the second series of rollers 36B. The angular offset p2 may be any fraction of the pitch p1 of the rollers, and in the example illustrated in FIG. 23 the angular offset p2 is half the pitch p1. Of course, if the co-axial series of rollers are de-phased then so must be the co-axial sprockets 80A, 80B. De-phasing the series of rollers may improve meshing engagement with the sprockets and may reduce vibration and improve wear characteristics of the roller gear 34 and sprocket 60. In the unlikely event that one roller should fail then the de-phased rollers would be failure tolerant.

Similar to the arrangement shown in FIG. 13, the driven gear 20 of the third embodiment may be fixed to the wheel via a flexible interface, e.g. a rubber bushing, to isolate the driven gear from wheel deformation loads.

In the illustrated example of the third embodiment where the landing gear has two wheels, only one of which is driven, the driven wheels of the aircraft will likely be the outer wheels of the two landing gears with respect to the aircraft centreline. Alternatively, the inner wheels may be driven. It is unlikely that one inner and one outer wheel would be driven, although this is of course a possibility. Where only outer wheels, or only inner wheels, are driven then the drive system may need to be handed which has cost implications. To maximise commonality of parts the drive system 50 could comprise attachment lugs for the actuator 58 on both sides of the epicyclic gearbox, and the end stop 94 may also be provided on both sides. With these minor modifications the drive system 50 could be handed for both sides of the aircraft. The use of an epicyclic gearbox may be preferable over the parallel axis gearbox for this purpose.

The multiple co-axial sprockets of the first sprocket and/or the second sprocket may be discrete sprocket wheels each having radially-extending teeth, the sprocket wheels being mounted adjacently on a common axis of rotation. Alternatively the multiple co-axial sprockets of the first sprocket and/or the second sprocket may be a single sprocket wheel having a plurality of adjacent rows of radially-extending teeth, each row of teeth being separated by a groove.

Whilst in the first to third embodiments described above the motor of the drive system is pivotally mounted to the landing gear structure for rotation so as to engage the drive pinion(s), in an alternative embodiment the motor may be fixed relative to the un-sprung part of the landing gear structure, e.g. the lower telescopic part 12*b* (slider) of the leg. The motor may drive a first spur gear having an axis of rotation that is also fixed with respect to the landing gear structure, and that is in meshing engagement with a second spur gear having an axis of rotation that is moveable through a relatively small angle along an arc at a fixed distance from the axis of rotation of the first spur gear. A drive pinion, e.g. the first sprocket described above, is co-axial with the second spur gear. Rotation of the motor may cause the drive pinion to move along the arc between a first configuration in which the drive pinion is in meshing engagement with the driven gear and a second configuration in which the drive pinion is not capable of meshing with the driven gear. The first spur gear may be driven through an epicyclic gearbox by the motor, where the first spur gear, the epicyclic gearbox and the motor centre are co-axially aligned. The spur gears may be sealed. One of the first pinion and the driven gear may include single or multiple co-axial sprockets, and the other of the first pinion and driven gear may include single or multiple co-axial rings of rollers, similar to those described above.

Although the invention has been described above with reference to one or more preferred embodiments, it will be appreciated that various changes or modifications may be made without departing from the scope of the invention as defined in the appended claims.

The invention claimed is:

1. A drive system for rotating a wheel of an aircraft landing gear, the drive system including a motor operable to rotate a first drive pinion via a first drive path, and a driven gear adapted to be fixed to the wheel, wherein the drive system has a first configuration in which the first drive pinion meshes with the driven gear to permit the motor to drive the driven gear via the first drive path, and wherein one of the first drive pinion and the driven gear comprises a first sprocket and the other of the first drive pinion and the driven gear comprises a series of rollers arranged in two or more rows, each row of rollers being arranged to form a ring, each roller being rotatable about a roller axis at a fixed distance from an axis of rotation of the first drive pinion or driven gear, respectively, wherein each of the series of rollers is rotatable about a pin, the pins each being fixed to an annular support member, and wherein the drive system is switchable between the first configuration and a second configuration in which the first drive pinion does not mesh with the driven gear.

2. The drive system according to claim 1, wherein two of the rows of rollers are arranged one on each side of the annular support member.

3. The drive system according to claim 2, further comprising two annular rings, wherein the rows of rollers extend between the annular support member and a respective one of the annular rings.

4. The drive system according to claim 1, wherein the first sprocket is provided with two or more rows of teeth, and wherein in the first configuration each row of teeth meshes with a respective row of rollers.

5. The drive system according to claim 1, wherein the first drive pinion comprises the first sprocket and the driven gear comprises the series of rollers.

6. The drive system according to claim 1, wherein adjacent rows of rollers are out of phase by a fraction of the roller pitch.

7. The drive system according to claim 1, including a second drive pinion, the motor being operable to rotate the second drive pinion via a second drive path, wherein the drive system is switchable between the first configuration and a third configuration in which the second drive pinion meshes with the driven gear to permit the motor to drive the driven gear via the second drive path, wherein if the first drive pinon comprises the first sprocket then the second drive pinion comprises a second sprocket and the driven gear comprises the series of rollers, or if the first drive pinon comprises the series of rollers then the second drive pinon comprises another series of rollers and the driven gear comprises the first sprocket, and wherein the first drive path has a higher gearing ratio than the second drive path.

8. The drive system according to claim 7, wherein the first drive pinon comprises the first drive sprocket, the second drive pinion comprises the second sprocket and the driven gear comprises the series of rollers.

9. The drive system according to claim 7, wherein the drive system is switchable between the first and third configurations and second configuration in which neither the first nor second drive pinions mesh with the driven gear.

10. The drive system according to claim 7, wherein the first and second drive pinions are movable relative to the driven gear such that the first and second pinions cannot both mesh with the driven gear at the same time.

11. The drive system according to claim 7, including an actuator arranged to move the drive system between the first and third configurations.

12. An aircraft landing gear having a wheel and the drive system according to claim 1, wherein the driven gear of the drive system is fixed to the wheel.

13. The An aircraft landing gear according to claim 12, wherein the wheel is driveable for taxiing the aircraft on the ground and/or spinning-up the wheel prior to landing.

14. The aircraft landing gear as claimed in claim 13, wherein the drive system is supported by a bracket which is rigidly connected to an axle, main fitting or slider part of the landing gear.

15. The aircraft landing gear as claimed in claim 12, wherein the drive system is supported by a bracket which is rigidly connected to an axle, main fitting or slider part of the landing gear.

16. A drive system for rotating a wheel of an aircraft landing gear, the drive system including a motor operable to rotate a first drive pinion via a first drive path, and a driven gear adapted to be fixed to the wheel, wherein the drive system has a first configuration in which the first drive pinion meshes with the driven gear to permit the motor to drive the driven gear via the first drive path, and wherein one of the first drive pinion and the driven gear comprises a first sprocket and the other of the first drive pinion and the driven gear comprises a series of rollers arranged in two or more rows, each row of rollers being arranged to form a ring, each roller being rotatable about a roller axis at a fixed distance from an axis of rotation of the first drive pinion or driven gear, respectively, wherein each of the series of rollers is rotatable about a pin, the pins each being fixed to an annular support member, and wherein two of the rows of rollers are arranged one on each side of the annular support member.

17. A drive system for rotating a wheel of an aircraft landing gear, the drive system including a motor operable to rotate a first drive pinion via a first drive path, and a driven gear adapted to be fixed to the wheel, wherein the drive system has a first configuration in which the first drive pinion meshes with the driven gear to permit the motor to drive the driven gear via the first drive path, and wherein one of the first drive pinion and the driven gear comprises a first sprocket and the other of the first drive pinion and the driven gear comprises a series of rollers arranged in two or more rows, each row of rollers being arranged to form a ring, each roller being rotatable about a roller axis at a fixed distance from an axis of rotation of the first drive pinion or driven gear, respectively, wherein each of the series of rollers is rotatable about a pin, the pins each being fixed to an annular support member, and wherein adjacent rows of rollers are out of phase by a fraction of the roller pitch.

* * * * *